US009287542B2

(12) United States Patent
Takita et al.

(10) Patent No.: US 9,287,542 B2
(45) Date of Patent: Mar. 15, 2016

(54) MULTI-LAYER, MICROPOROUS POLYOLEFIN MEMBRANE, ITS PRODUCTION METHOD, BATTERY SEPARATOR, AND BATTERY

(75) Inventors: Kotaro Takita, Nasushiobara (JP); Junko Takita, legal representative, Tochigi-ken (JP); Shintaro Kikuchi, Saitama (JP)

(73) Assignee: TORAY BATTERY SEPARATOR FILM CO., LTD, Nasushiobara-Shi (JP)

( * ) Notice: Subject to any disclaimer, the term of this patent is extended or adjusted under 35 U.S.C. 154(b) by 892 days.

(21) Appl. No.: 13/547,850

(22) Filed: Jul. 12, 2012

(65) Prior Publication Data

US 2012/0273114 A1  Nov. 1, 2012

Related U.S. Application Data

(63) Continuation of application No. 12/296,242, filed as application No. PCT/JP2007/057858 on Apr. 9, 2007, now Pat. No. 8,252,450.

(30) Foreign Application Priority Data

Apr. 7, 2006  (JP) ................................. 2006-106175

(51) Int. Cl.
*H01M 2/16* (2006.01)
*B29C 55/06* (2006.01)
(Continued)

(52) U.S. Cl.
CPC ........... *H01M 2/1653* (2013.01); *B29C 55/065* (2013.01); *B29C 55/12* (2013.01);
(Continued)

(58) Field of Classification Search
CPC .................................................... H01M 2/1653
See application file for complete search history.

(56) References Cited

U.S. PATENT DOCUMENTS

| 5,683,634 A | 11/1997 | Fujii et al. |
| 6,666,969 B1 | 12/2003 | Funaoka et al. |

(Continued)

FOREIGN PATENT DOCUMENTS

| JP | 06-240036 A | 8/1994 |
| JP | 07-216118 A | 8/1995 |

(Continued)

OTHER PUBLICATIONS

European Office Action dated Jan. 24, 2013, issued in European Patent Application No. 07 741 294.8.

(Continued)

*Primary Examiner* — Larry Thrower
(74) *Attorney, Agent, or Firm* — Sughrue Mion, PLLC

(57) ABSTRACT

A multi-layer, microporous polyolefin membrane comprising first microporous layers constituting at least both surface layers, and at least one second microporous layer disposed between both surface layers, the first microporous layer comprising a first polyethylene resin containing 8% or more by mass of ultra-high-molecular-weight polyethylene having a weight-average molecular weight of $1 \times 10^6$ or more, the second microporous layer comprising a second polyethylene resin containing 7% or less by mass of the ultra-high-molecular-weight polyethylene, and having a structure in which a pore diameter distribution curve obtained by mercury intrusion porosimetry has at least two peaks, and the total thickness of the first microporous layers being 15-60% per 100% of the total thickness of the first and second microporous layers.

4 Claims, 1 Drawing Sheet

(51) Int. Cl.
*B29C 55/12* (2006.01)
*C08L 23/06* (2006.01)
*B29K 23/00* (2006.01)
*B29K 105/00* (2006.01)
*B29K 105/04* (2006.01)
*C08L 23/10* (2006.01)

(52) U.S. Cl.
CPC ........ *C08L 23/06* (2013.01); *B29K 2023/0683* (2013.01); *B29K 2105/0061* (2013.01); *B29K 2105/0088* (2013.01); *B29K 2105/04* (2013.01); *C08L 23/10* (2013.01); *C08L 2205/02* (2013.01); *Y10T 428/249978* (2015.04)

(56) References Cited

U.S. PATENT DOCUMENTS

| | | |
|---|---|---|
| 2005/0098913 A1 | 5/2005 | Funaoka et al. |
| 2006/0121269 A1 | 6/2006 | Miller et al. |
| 2007/0037047 A1 | 2/2007 | Ohashi et al. |
| 2008/0300332 A1 | 12/2008 | Miller et al. |
| 2008/0315447 A1 | 12/2008 | Miller et al. |
| 2009/0098449 A1 | 4/2009 | Funaoka et al. |
| 2009/0269672 A1 | 10/2009 | Takita et al. |
| 2009/0305127 A1 | 12/2009 | Miller et al. |
| 2010/0151310 A1 | 6/2010 | Takita et al. |

FOREIGN PATENT DOCUMENTS

| | | |
|---|---|---|
| JP | 10-195215 A | 7/1998 |
| JP | 2000-195490 A | 7/2000 |
| JP | 2000-260413 A | 9/2000 |
| JP | 2001-162741 A | 6/2001 |
| JP | 2002-321323 A | 11/2002 |
| JP | 2003-105121 A | 4/2003 |
| JP | 2003-105123 A | 4/2003 |
| JP | 2003-205433 A | 7/2003 |
| JP | 2006-240036 A | 9/2006 |
| JP | 2008-523211 A | 7/2008 |
| JP | 2009-012756 A | 1/2009 |
| WO | 00/20492 A1 | 4/2000 |
| WO | 00/20493 A1 | 4/2000 |
| WO | 2004/089627 A1 | 10/2004 |
| WO | 2005113657 A1 | 12/2005 |
| WO | 2006/062739 A2 | 6/2006 |
| WO | 2007/015547 A1 | 2/2007 |
| WO | 2007037289 A1 | 5/2007 |

OTHER PUBLICATIONS

Japanese Office Action dated May 29, 2012 issued in Japanese Patent Application No. 2006-106175.

European Search Report issued in corresponding European Application No. 07741294.8, dated Dec. 9, 2011.

MULTI-LAYER, MICROPOROUS POLYOLEFIN MEMBRANE, ITS PRODUCTION METHOD, BATTERY SEPARATOR, AND BATTERY

CROSS REFERENCES TO RELATED APPLICATIONS

This application is a Rule 53(b) continuation of co-pending U.S. patent application Ser. No. 12/296,242 filed Jan. 13, 2009, which in turn is a National Stage of PCT/JP2007/057858, filed Apr. 9, 2007, claiming priority based on Japanese Patent Application No. 2006-106175, filed Apr. 7, 2006. The specifications of all priority applications are incorporated herein by reference.

FIELD OF THE INVENTION

The present invention relates to a multi-layer, microporous polyolefin membrane having suitably well-balanced permeability, mechanical strength, meltdown properties, electrolytic solution absorption, and electrolytic solution retention, a method for producing such a multi-layer, microporous polyolefin membrane, a battery separator formed by such a multi-layer, microporous polyolefin membrane, and a battery comprising such a separator.

BACKGROUND OF THE INVENTION

Microporous polyolefin membranes are used for battery separators for primary batteries and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous polyolefin membrane is used for battery separators, particularly lithium ion battery separators, its performance largely affects the properties, productivity and safety of batteries. Accordingly, the microporous polyolefin membrane is required to have suitable permeability, mechanical properties, dimensional stability, shutdown properties, meltdown properties, etc. As is known, it is desirable for the batteries to have a relatively low shutdown temperature and a relatively high meltdown temperature for improved battery safety properties, particularly for batteries exposed to high temperatures during under operating conditions. High separator permeability is desirable for high battery capacity. A separator with high mechanical strength is desirable for improved battery assembly and fabrication properties.

The optimization of material compositions, stretching conditions, heat treatment conditions, etc. was proposed to improve the properties of microporous polyolefin membranes. For example, JP6-240036A, discloses a microporous polyolefin membrane having a proper pore diameter and a sharp pore diameter distribution. The membrane is made of a polyethylene resin containing 1% or more by mass of ultra-high-molecular-weight polyethylene having a weight-average molecular weight (Mw) of $7 \times 10^5$ or more, the polyethylene resin having a molecular weight distribution (weight-average molecular weight/number-average molecular weight) of 10-300, and the microporous polyolefin membrane having a porosity of 35-95%, an average penetrating pore diameter of 0.05-0.2 μm, a rupture strength (15-mm width) of 0.2 kg or more, and a pore diameter distribution (maximum pore diameter/average penetrating pore diameter) of 1.5 or less.

WO 2000/20492 discloses a microporous polyolefin membrane having improved permeability. The membrane contains fine fibrils made of polyethylene having Mw of $5 \times 10^5$ or more or a composition containing such polyethylene. The microporous polyolefin membrane has an average pore diameter of 0.05-5 μm, and the percentage of lamellas at angles θ of 80-100° relative to a membrane surface being 40% or more in longitudinal and transverse cross sections.

In general, microporous membranes consisting essentially of polyethylene (i.e., they contain polyethylene only with no significant presence of other species) have low meltdown temperatures. Accordingly, proposals have been made to provide microporous membranes made of mixed resins of polyethylene and polypropylene, and multi-layer, microporous membranes having polyethylene layers and polypropylene layers.

WO 2005/113657 discloses a microporous polyolefin membrane having pore-closability, thermal rupture resistance, dimensional stability and high-temperature strength. The membrane is made of a polyolefin composition comprising (a) a polyethylene resin containing 8-60% by mass of a component having a molecular weight of 10,000 or less, and an Mw/Mn ratio of 11-100, wherein Mn is the number-average molecular weight of the polyethylene resin, and a viscosity-average molecular weight (Mv) of 100,000-1,000,000, and (b) polypropylene, the membrane having a porosity of 20-95%, and a heat shrinkage ratio of 10% or less at 100° C. This microporous polyolefin membrane is produced by extruding a melt-blend of the above polyolefin composition and a membrane-forming solvent through a die, stretching a gel-like sheet obtained by cooling, removing the membrane-forming solvent, and annealing the sheet.

WO 2004/089627 discloses a microporous polyolefin membrane made of polyethylene and polypropylene as indispensable components, which is constituted by two or more layers, the polypropylene content being more than 50% and 95% or less by mass in at least one surface layer, and the polyethylene content being 50-95% by mass in the entire membrane. The membrane has improved permeability, high-temperature strength and safety, as well as low shutdown temperature and high short-circuiting temperature.

JP7-216118A discloses a battery separator formed by a porous film comprising polyethylene and polypropylene as indispensable components and having two microporous layers with different polyethylene contents, the polyethylene content being 0-20% by weight in one microporous layer, 21-60% by weight in the other microporous layer, and 2-40% by weight in the overall film. The battery separator has improved shutdown-starting temperature and mechanical strength.

With respect to the properties of separators, not only permeability, mechanical strength, dimensional stability, shutdown properties and meltdown properties, but also properties related to battery productivity such as electrolytic solution absorption, and battery cyclability such as electrolytic solution retention have recently been given importance. Particularly electrodes for lithium ion batteries expand and shrink according to the intrusion and departure of lithium, and recent increase in battery capacity leads to larger expansion ratios. Because separators are compressed when the electrodes expand, the separators are required to suffer as little decrease as possible in electrolytic solution retention by compression. However, when the separators are provided with larger pore diameters to have improved electrolytic solution absorption, the electrolytic solution retention of the separators decrease. Battery separators disclosed in any of JP6-240036A, WO 2000/20492, WO 05/113657, WO 04/089627 and JP7-

216118A are insufficient in electrolytic solution absorption and/or retention. Thus, microporous membranes for battery separators are desired to have well-balanced permeability, mechanical strength, meltdown properties, electrolytic solution absorption, and electrolytic solution retention.

OBJECTS OF THE INVENTION

Accordingly, an object of the present invention is to provide a multi-layer, microporous polyolefin membrane having well-balanced permeability, mechanical strength, meltdown properties, electrolytic solution absorption, and electrolytic solution retention.

Another object of the present invention is to provide a method for producing such a multi-layer, microporous polyolefin membrane.

A further object of the present invention is to provide a battery separator formed by such a multi-layer, microporous polyolefin membrane.

A still further object of the present invention is to provide a battery comprising such a separator.

DISCLOSURE OF THE INVENTION

As a result of intense research in view of the above objects, the inventors have found that when (a) a multi-layer, microporous polyolefin membrane is composed of at least one first microporous layer and at least one second microporous layer, when (b) the first microporous layer is made of a first polyethylene resin containing 8% or more by mass of ultra-high-molecular-weight polyethylene having a weight-average molecular weight of $1\times10^6$ or more, when (c) the second microporous layer is made of a second polyethylene resin containing 7% or less by mass of the ultra-high-molecular-weight polyethylene, and having a structure in which a pore diameter distribution curve obtained by mercury intrusion porosimetry has at least two peaks, and when (d) the total thickness of the first microporous layers (the thickness of the first microporous layer in the case of a two layer structure) is 15-60% per 100% of the total thickness of the first and second microporous layers, a multi-layer, microporous polyolefin membrane with well-balanced permeability, mechanical strength, meltdown properties, electrolytic solution absorption, and electrolytic solution retention can be obtained. The present invention has been completed based on such finding.

Thus, the multi-layer, microporous polyolefin membrane of the present invention comprises first microporous layers constituting at least both surface layers, and at least one second microporous layer disposed between both surface layers, the first microporous layer comprising a first polyethylene resin containing 8% or more by mass of ultra-high-molecular-weight polyethylene having a weight-average molecular weight of $1\times10^6$ or more, the second microporous layer comprising a second polyethylene resin containing 7% or less by mass of the ultra-high-molecular-weight polyethylene, and having a structure in which a pore diameter distribution curve obtained by mercury intrusion porosimetry has at least two peaks, and the total thickness of the first microporous layers being 15-60% per 100% of the total thickness of the first and second microporous layers.

It is preferable that the first microporous layer has an average pore diameter of 0.005-0.1 μm, and that the second microporous layer has an average pore diameter of 0.02-0.5 μm. The average pore diameter ratio of the second microporous layer to the first microporous layer is preferably more than 1/1 and 10/1 or less.

The second microporous layer preferably comprises dense domains having a main peak in a range of 0.01-0.08 μm and coarse domains having at least one sub-peak in a range of more than 0.08 μm and 1.5 μm or less in the pore diameter distribution curve. The pore volume ratio of the dense domains to the coarse domains is preferably 0.5-49.

The multi-layer, microporous polyolefin membrane preferably has a three-layer structure having a pair of the first microporous layers on both surfaces of the second microporous layer.

In the multi-layer, microporous polyolefin membrane according to one preferred embodiment of the present invention, the first microporous layer is made of (i) the ultra-high-molecular-weight polyethylene, (ii) a first polyethylene composition comprising the ultra-high-molecular-weight polyethylene and high-density polyethylene having a weight-average molecular weight of $1\times10^4$ to $5\times10^5$, the percentage of the ultra-high-molecular-weight polyethylene being 8% or more by mass, (iii) a mixture of the ultra-high-molecular-weight polyethylene and polypropylene, the percentage of polypropylene being 25% or less by mass, or (iv) a mixture of the first polyethylene composition and polypropylene, the percentage of polypropylene being 25% or less by mass; and the second microporous layer is made of (i) the high-density polyethylene, (ii) a second polyethylene composition comprising the ultra-high-molecular-weight polyethylene and the high-density polyethylene, the percentage of the ultra-high-molecular-weight polyethylene being 7% or less by mass, (iii) a mixture of the high-density polyethylene and polypropylene, the percentage of polypropylene being 25% or less by mass, or (iv) a mixture of the second polyethylene composition and polypropylene, the percentage of polypropylene being 25% or less by mass.

The first method for producing a multi-layer, microporous polyolefin membrane according to the present invention comprises the steps of (1) preparing a first polyolefin solution comprising a first polyethylene resin containing 8% or more by mass of ultra-high-molecular-weight polyethylene having a weight-average molecular weight of $1\times10^6$ or more and a membrane-forming solvent, and a second polyolefin solution comprising a second polyethylene resin containing 7% or less by mass of the ultra-high-molecular-weight polyethylene and a membrane-forming solvent, (2) simultaneously extruding the first and second polyolefin solutions through a die, such that the first polyolefin solution forms at least both surface layers, while the second polyolefin solution forms at least one layer between both surface layers, (3) cooling the resultant extrudate, (4) stretching the resultant multi-layer, gel-like sheet, (5) removing the membrane-forming solvent from the multi-layer, gel-like sheet, and (6) stretching the resultant multi-layer, microporous membrane to 1.1-1.8 folds in at least one direction.

The second method for producing a multi-layer, microporous polyolefin membrane according to the present invention comprises the steps of (1) preparing a first polyolefin solution comprising a first polyethylene resin containing 8% or more by mass of ultra-high-molecular-weight polyethylene having a weight-average molecular weight of $1\times10^6$ or more and a membrane-forming solvent, and a second polyolefin solution comprising a second polyethylene resin containing 7% or less by mass of the ultra-high-molecular-weight polyethylene and a membrane-forming solvent, (2) extruding the first and second polyolefin solutions from separate dies and immediately laminating them, such that the first polyolefin solution forms at least both surface layers, while the second polyolefin solution forms at least one layer between both surface layers, (3) cooling the resultant extrudate, (4) stretching the resultant multi-layer, gel-like sheet, (5) removing the membrane-forming solvent from the multi-layer, gel-like sheet, and (6) stretching the resultant multi-layer, microporous membrane to 1.1-1.8 folds in at least one direction.

The third method for producing a multi-layer, microporous polyolefin membrane according to the present invention comprises the steps of (1) preparing a first polyolefin solution comprising a first polyethylene resin containing 8% or more by mass of ultra-high-molecular-weight polyethylene having a weight-average molecular weight of $1 \times 10^6$ or more and a membrane-forming solvent, and a second polyolefin solution comprising a second polyethylene resin containing 7% or less by mass of the ultra-high-molecular-weight polyethylene and a membrane-forming solvent, (2) extruding the first and second polyolefin solutions through separate dies, (3) cooling the resultant extrudates to form first and second gel-like sheets, (4) stretching each gel-like sheet, (5) laminating the first and second gel-like sheets, such that the first gel-like sheet forms at least both surface layers, while the second gel-like sheet forms at least one layer between both surface layers, (6) removing the membrane-forming solvent from the resultant multi-layer, gel-like sheet, and (7) stretching the resultant multi-layer, microporous membrane to 1.1-1.8 folds in at least one direction.

The fourth method for producing a multi-layer, microporous polyolefin membrane according to the present invention comprises the steps of (1) preparing a first polyolefin solution comprising a first polyethylene resin containing 8% or more by mass of ultra-high-molecular-weight polyethylene having a weight-average molecular weight of $1 \times 10^6$ or more and a membrane-forming solvent, and a second polyolefin solution comprising a second polyethylene resin containing 7% or less by mass of the ultra-high-molecular-weight polyethylene and a membrane-forming solvent, (2) extruding the first and second polyolefin solutions through separate dies, (3) cooling the resultant extrudates to form first and second gel-like sheets, (4) stretching each gel-like sheet, (5) removing the membrane-forming solvent from each stretched gel-like sheet to form first and second microporous polyolefin membranes, (6) stretching at least the second microporous polyolefin membrane to 1.1-1.8 folds in at least one direction, and (7) laminating the first and second microporous polyolefin membranes, such that the first microporous polyolefin membrane forms at least both surface layers, while the second microporous polyolefin membrane forms at least one layer between both surface layers.

In the first to fourth methods, the stretching of the (multi-layer) microporous membrane may be called "re-stretching," because it is conducted after the stretching of the (multi-layer) gel-like sheet.

The battery separator of the present invention is formed by the above multi-layer, microporous polyolefin membrane.

The battery of the present invention comprises the above separator formed by the multi-layer, microporous polyolefin membrane.

DESCRIPTION OF THE PREFERRED EMBODIMENTS

Figure 1:
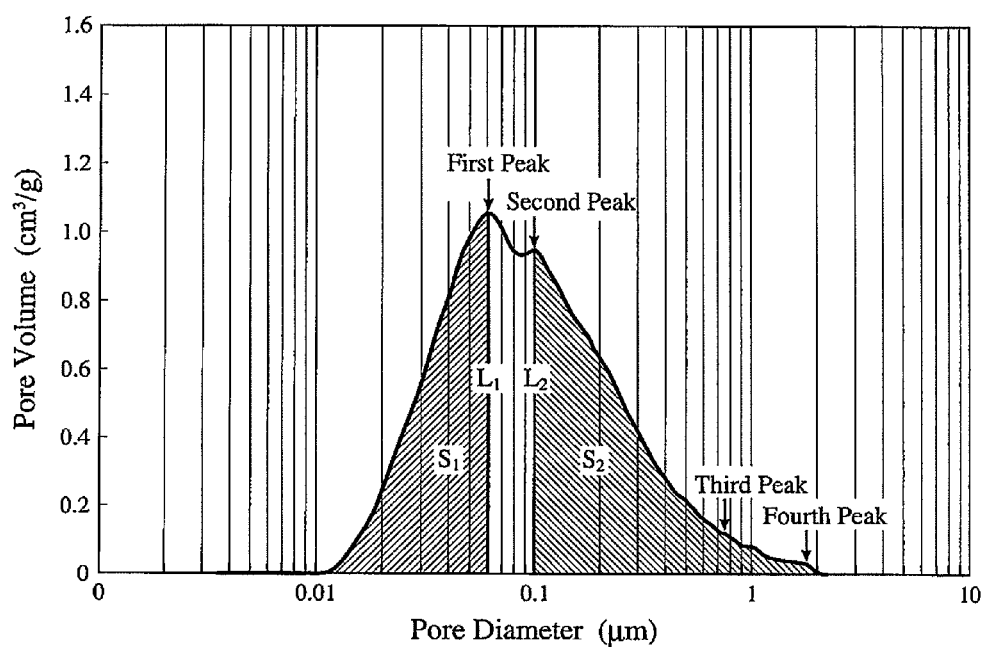
FIG. 1 is a graph showing a typical pore diameter distribution curve.

The multi-layer, microporous polyolefin membrane of the present invention comprises at least one first microporous layer made of a first polyolefin, and at least one second microporous layer made of a second polyolefin. In the case of the three or more layer structure, the multi-layer, microporous polyolefin membrane comprises the first microporous layers constituting both surface layers, and at least one second microporous layer disposed between both surface layers. Both surface layers may be composed of the same or different components, though the same components are preferable.

[1] Composition of Multi-Layer, Microporous Polyolefin Membrane (A) First Polyolefin The first polyolefin used in forming the first microporous layer (both surface layers, in the case of the three or more layer structure) of the multi-layer, microporous polyolefin membrane is (1) a first polyethylene resin, which is (a) ultra-high-molecular-weight polyethylene having a weight-average molecular weight (Mw) of $1 \times 10^6$ or more, or (b) a first polyethylene composition comprising the ultra-high-molecular-weight polyethylene and polyethylene other than the ultra-high-molecular-weight polyethylene, the percentage of the ultra-high-molecular-weight polyethylene being 8% or more by mass, or (2) a mixture of the first polyethylene resin and 25% or less by mass of polypropylene.

The first polyolefin will now be described in more detail.

(1) First Polyethylene Resin

The first polyethylene resin comprises (a) the ultra-high-molecular-weight polyethylene having a weight-average molecular weight (Mw) of $1 \times 10^6$ or more, or (b) the first polyethylene composition comprising the ultra-high-molecular-weight polyethylene and polyethylene other than the ultra-high-molecular-weight polyethylene having a lower molecular weight than the ultra-high-molecular-weight polyethylene, the percentage of the ultra-high-molecular-weight polyethylene being 8% or more by mass based on 100% by mass of the first polyethylene composition.

(a) Ultra-High-Molecular-Weight Polyethylene

The ultra-high-molecular-weight polyethylene has Mw of $1 \times 10^6$ or more. The ultra-high-molecular-weight polyethylene may be an ethylene homopolymer, or an ethylene.α-olefin copolymer containing a small amount of the other α-olefin. The α-olefin other than ethylene is preferably propylene, butene-1, pentene-1, hexene-1,4-methylpentene-1, octene-1, vinyl acetate, methyl methacrylate, or styrene. The Mw of the ultra-high-molecular-weight polyethylene is preferably $1 \times 10^6$ to $15 \times 10^6$, more preferably $1 \times 10^6$ to $5 \times 10^6$, most preferably $1 \times 10^6$ to $3 \times 10^6$.

(b) First Polyethylene Composition

The other polyethylene than the ultra-high-molecular-weight polyethylene is preferably at least one selected from the group consisting of high-density polyethylene, medium-density polyethylene, branched low-density polyethylene, and linear low-density polyethylene, and its Mw is preferably $1 \times 10^4$ to $5 \times 10^5$. The more preferred polyethylene is high-density polyethylene, and its Mw is preferably $1 \times 10^5$ to $5 \times 10^5$, more preferably $2 \times 10^5$ to $4 \times 10^5$. The other polyethylene than the ultra-high-molecular-weight polyethylene may be an ethylene homopolymer, or a copolymer containing a small amount of the other α-olefin such as propylene, butene-1, hexene-1, etc. Such copolymer is preferably produced using a single-site catalyst.

The percentage of the ultra-high-molecular-weight polyethylene in the polyethylene composition is 8% or more by mass. When the ultra-high-molecular-weight polyethylene is less than 8% by mass, the multi-layer, microporous membrane has poor strength. The percentage of the ultra-high-molecular-weight polyethylene is preferably 20% or more by mass, more preferably 25% or more by mass.

(2) Polypropylene

When the first polyolefin comprises the first polyethylene composition and polypropylene, the percentage of polypropylene is 25% or less by mass based on 100% by mass of the entire first polyolefin. When this percentage is more than 25% by mass, the multi-layer, microporous membrane has poor mechanical strength. This percentage is preferably 15% or less by mass, more preferably 10% or less by mass.

Polypropylene may be a propylene homopolymer or a copolymer of propylene and the other olefin, though the homopolymer is preferable. The copolymer may be a random or block copolymer. The other olefins than propylene include α-olefins such as ethylene, butene-1, pentene-1, hexene-1,4-methylpentene-1, octene-1, vinyl acetate, methyl methacrylate, styrene, etc., and diolefins such as butadiene, 1,5-hexadiene, 1,7-octadiene, 1,9-decadiene, etc. The percentage of the other olefin in the propylene copolymer is preferably in a range not deteriorating the properties of polypropylene such as heat resistance, compression resistance, heat shrinkage resistance, etc., specifically less than 10% by mol.

The weight-average molecular weight (Mw) of polypropylene is preferably $1 \times 10^4$ to $4 \times 10^6$, more preferably $3 \times 10^5$ to $3 \times 10^6$. The molecular weight distribution (Mw/Mn) of polypropylene is preferably 1.01-100, more preferably 1.1-50.

(B) Second Polyolefin

The second polyolefin is (a) a second polyethylene resin, which is polyethylene other than ultra-high-molecular-weight polyethylene having Mw of $1 \times 10^6$ or more, or a second polyethylene composition comprising the ultra-high-molecular-weight polyethylene and the other polyethylene than the ultra-high-molecular-weight polyethylene, the percentage of the ultra-high-molecular-weight polyethylene being 7% or less by mass, or (b) a mixture of the second polyethylene resin and 25% or less by mass of polypropylene. The ultra-high-molecular-weight polyethylene and the other polyethylene may be the same as described above. The ultra-high-molecular-weight polyethylene and the other polyethylene used in the second polyethylene resin may be the same as or different from the ultra-high-molecular-weight polyethylene and the other polyethylene used in the first polyethylene resin respectively. Preferably, the same polyethylenes are used.

When the percentage of the ultra-high-molecular-weight polyethylene in the second polyethylene resin is more than 7% by mass, the later-described hybrid structure is not formed. The percentage of the ultra-high-molecular-weight polyethylene is preferably 5% or less by mass, more preferably 3% or less by mass.

The Mw of the second polyethylene resin is preferably $1 \times 10^6$ or less, more preferably $1 \times 10^5$ to $1 \times 10^6$, most preferably $2 \times 10^5$ to $1 \times 10^6$. When the Mw of the second polyethylene composition is more than $1 \times 10^6$, the hybrid structure is not formed. When the Mw of the second polyethylene composition is less than $1 \times 10^5$, the multi-layer, microporous membrane is likely to be broken when stretched.

(2) Polypropylene

When the second polyolefin comprises the second polyethylene resin and polypropylene, the percentage of polypropylene is 25% or less by mass, preferably 15% or less by mass, more preferably 10% or less by mass, based on 100% by mass of the entire second polyolefin. The polypropylene per se may be the same as in the first polyolefin.

(C) Molecular Weight Distribution Mw/Mn

Mw/Mn is a measure of a molecular weight distribution; the larger this value, the wider the molecular weight distribution. In any of the first and second polyolefins, Mw/Mn is preferably 5-300, more preferably 5-100, most preferably 5-30 in the ultra-high-molecular-weight polyethylene and the other polyethylene. When the Mw/Mn is less than 5, the percentage of a high-molecular-weight component is too high to conduct melt extrusion easily. On the other hand, when the Mw/Mn is more than 300, the percentage of a low-molecular-weight component is too high, resulting in decrease in the strength of the multi-layer, microporous membrane. The Mw/Mn of polyethylene (homopolymer or an ethylene.α-olefin copolymer) can be properly controlled by a multi-stage polymerization. The multi-stage polymerization method is preferably a two-stage polymerization method comprising forming a high-molecular-weight polymer component in the first stage, and forming a low-molecular-weight polymer component in the second stage. In the case of the polyethylene composition, the larger the Mw/Mn, the larger difference in Mw exists between the ultra-high-molecular-weight polyethylene and the other polyethylene, and vice versa. The Mw/Mn of the polyethylene composition can be properly controlled by the molecular weights and mixing ratios of components.

(D) Other Polyolefins

In addition to the above components, each of the first and second polyolefins may contain at least one selected from the group consisting of (a) polybutene-1, polypentene-1, poly-4-methylpentene-1, polyhexene-1, polyoctene-1, polyvinyl acetate, polymethyl methacrylate, polystyrene and an ethylene.α-olefin copolymer, each of which may have Mw of $1 \times 10^4$ to $4 \times 10^6$, and (b) a polyethylene wax having Mw of $1 \times 10^3$ to $1 \times 10^4$, in an amount not deteriorating the properties of the multi-layer, microporous membrane. Polybutene-1, polypentene-1, poly-4-methylpentene-1, polyhexene-1, polyoctene-1, polyvinyl acetate, polymethyl methacrylate and polystyrene are not restricted to homopolymers, but may be copolymers containing other α-olefins.

[2] Production Method of Multi-Layer, Microporous Polyolefin Membrane (A) First Production Method The first method for producing the multi-layer, microporous polyolefin membrane comprises the steps of (1) melt-blending a first polyolefin and a membrane-forming solvent to prepare a first polyolefin solution, (2) melt-blending a second polyolefin and a membrane-forming solvent to prepare a second polyolefin solution, (3) simultaneously extruding the first and second polyolefin solutions through a die, (4) cooling the extrudate to form a multi-layer, gel-like sheet, (5) stretching the multi-layer, gel-like sheet, (6) removing the membrane-forming solvent from the multi-layer, gel-like sheet, (7) drying the resultant multi-layer membrane, and (8) stretching the resultant dried multi-layer, microporous membrane. After the step (8), if necessary, a heat treatment step (9), a step (10) of cross-linking with ionizing radiations, a hydrophilizing treatment step (11), etc. may be conducted.

(1) Preparation of First Polyolefin Solution

The first polyolefin is melt-blended with a membrane-forming solvent to prepare a first polyolefin solution. The first polyolefin solution may contain various additives such as antioxidants, ultraviolet absorbers, antiblocking agents, pigments, dyes, inorganic fillers, pore-forming agents such as fine silicate powder, etc. in ranges not deteriorating the effects of the present invention, if necessary.

The membrane-forming solvent is preferably liquid at room temperature. The use of a liquid solvent makes it possible to conduct stretching at a relatively high magnification. The liquid solvents may be aliphatic, alicyclic or aromatic hydrocarbons such as nonane, decane, decalin, p-xylene, undecane, dodecane, liquid paraffin, etc., mineral oil distillates having boiling points comparable to those of the above hydrocarbons, and phthalates liquid at room temperature such as dibutyl phthalate, dioctyl phthalate, etc. To obtain a multi-layer, gel-like sheet having a stable liquid solvent content, it is preferable to use non-volatile liquid solvents such as liquid paraffin. A solvent which is miscible with polyethylene in a melt-blended state but solid at room temperature may be used instead of or with the liquid solvent. Such solid solvent includes stearyl alcohol, ceryl alcohol, paraffin waxes, etc. However, when only a solid solvent is used, uneven stretching, etc. are likely to occur.

The viscosity of the liquid solvent is preferably 30-500 cSt, more preferably 30-200 cSt, at 25° C. When the viscosity at 25° C. is less than 30 cSt, the first polyolefin solution is easily foamed, resulting in difficulty in blending. On the other hand, when the viscosity is more than 500 cSt, the removal of the liquid solvent is difficult.

Though not particularly restricted, the uniform melt-blending of the first polyolefin solution is preferably conducted in a double-screw extruder to prepare a high-concentration polyolefin solution. The membrane-forming solvent may be added before blending, or charged into the double-screw extruder in an intermediate portion during blending, though the latter is more preferable.

The melt-blending temperature of the first polyolefin solution is preferably in a range of the melting point $Tm_1$ of the first polyethylene resin+10° C. to $Tm_1$+120° C. The melting point is measured by differential scanning calorimetry (DSC) according to JIS K7121. Specifically, the melt-blending temperature is preferably 140-250° C., more preferably 170-240° C., because the above ultra-high-molecular-weight polyethylene, the other polyethylene and the first polyethylene composition have melting points of about 130-140° C.

A ratio L/D of the screw length L to the screw diameter D in the double-screw extruder is preferably in a range of 20-100, more preferably in a range of 35-70. When L/D is less than 20, melt-blending is insufficient. When L/D is more than 100, the residing time of the polyolefin solution in the double-screw extruder is too long. The cylinder of the double-screw extruder preferably has an inner diameter of 40-100 mm.

The concentration of the first polyolefin solution is 1-75% by mass, preferably 20-70% by mass. When the concentration is less than 1% by mass, productivity is low, and large swelling or neck-in occurs at the die exit during extrusion, resulting in decrease in the formability and self-supportability of the multi-layer, gel-like sheet. On the other hand, when the concentration is more than 75% by mass, the formability of the multi-layer, gel-like sheet is deteriorated.

(2) Preparation of Second Polyolefin Solution

The second polyolefin is melt-blended with a membrane-forming solvent to prepare a second polyolefin solution. Because conditions other than described below may be the same as in the preparation of the first polyolefin solution, their explanation will be omitted. The solvent used in the second polyolefin solution may be the same as or different from the solvent used in the first polyolefin solution. Preferably, the same solvent is used.

The melt-blending temperature of the second polyolefin solution is preferably in a range of the melting point $Tm_2$ of the second polyethylene resin +10° C. to $Tm_2$+120° C. Specifically, the melt-blending temperature is preferably 140-250° C., more preferably 170-240° C., because the ultra-high-molecular-weight polyethylene, the other polyethylene, and the second polyethylene composition have melting points of about 130-140° C.

To obtain a good hybrid structure, the concentration of the second polyethylene resin in the second polyolefin solution is preferably 25-50% by mass, more preferably 25-45% by mass.

(3) Extrusion

The first and second polyolefin solutions are supplied from their extruders to a die, combined in a laminar form therein, and simultaneously extruded therefrom in a sheet form. In the case of producing the three or more layer, microporous membrane, the first and second polyolefin solutions are combined in a laminar form, such that the first polyolefin solution forms at least both surface layers, while the second polyolefin solution forms at least one layer between the surface layers, and simultaneously extruded in a sheet form.

Any of a flat die method and an inflation method may be used for the extrusion. Usable in any method is a multi-manifold method, in which the solutions are supplied to separate manifolds and laminated at a lip inlet of a multi-layer extrusion die, or a block method, in which solutions are combined to a laminar flow in advance and supplied to a die. Because the multi-manifold method and the block method per se are known, their detailed explanations will be omitted. The multi-layer-sheet-forming flat die preferably has a gap of 0.1-5 mm. The extrusion temperature is preferably 140-250° C., and the extruding speed is preferably 0.2-15 m/minute. The thickness ratio of the first microporous layer to the second microporous layer can be controlled by adjusting the amounts of the first and second polyolefin solutions extruded.

(4) Formation of Multi-Layer, Gel-Like Sheet

The resultant laminar extrudate is cooled to form a multi-layer, gel-like sheet. Cooling is preferably conducted at least to a gelation temperature at a speed of 50° C./minute or more. Cooling is preferably conducted to 25° C. or lower. Such cooling sets the micro-phases of the first and second polyolefins separated by the membrane-forming solvent. Generally, the slower cooling speed provides the multi-layer, gel-like sheet with larger pseudo-cell units, resulting in a coarser higher-order structure. On the other hand, the higher cooling speed results in denser cell units. The cooling speed less than 50° C./minute leads to increased crystallinity, making it unlikely to provide the multi-layer, gel-like sheet with suitable stretchability. Usable as the cooling method are a method of bringing the extrudate into contact with a cooling medium such as cooling air, cooling water, etc., a method of bringing the extrudate into contact with cooling rolls, etc.

(5) Stretching of Multi-Layer, Gel-Like Sheet

The multi-layer, gel-like sheet is stretched in at least one direction. The multi-layer, gel-like sheet can be uniformly stretched because it contains the membrane-forming solvent. The multi-layer, gel-like sheet is preferably stretched to a predetermined magnification after heated, by a tenter method, a roll method, an inflation method or a combination thereof. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) may be used, though the simultaneous biaxial stretching is preferable.

The stretching magnification is preferably 2 folds or more, more preferably 3-30 folds in the case of monoaxial stretching. In the case of biaxial stretching, the stretching magnification is preferably 3 folds or more in any direction, namely 9 folds or more, more preferably 16 folds or more, most preferably 25 folds or more, in area magnification. With the area magnification of 9 folds or more, the pin puncture strength of the multi-layer, microporous membrane is improved. When the area magnification is more than 400 folds, stretching apparatuses, stretching operations, etc. are restricted.

To obtain a good hybrid structure, the stretching temperature is preferably in a range of the crystal dispersion temperature $Tcd_2$ of the second polyethylene resin to $Tcd_2+25°$ C., more preferably in a range of $Tcd_2+10°$ C. to $Tcd_2+25°$ C., most preferably in a range of $Tcd_2+15°$ C. to $Tcd_2+25°$ C. When the stretching temperature is lower than $Tcd_2$, the polyethylene resin is so insufficiently softened that the multi-layer, gel-like sheet is easily broken by stretching, failing to achieve high-magnification stretching.

The crystal dispersion temperature is determined by measuring the temperature characteristics of dynamic viscoelasticity according to ASTM D 4065. Because the ultra-high-molecular-weight polyethylene, the other polyethylene than the ultra-high-molecular-weight polyethylene, and the first and second polyethylene compositions have crystal dispersion temperatures of about 90-100° C., the stretching temperature is 90-125° C., preferably 100-125° C., more preferably 105-125° C.

The above stretching causes cleavage between polyethylene lamellas, making the polyethylene phases finer and forming large numbers of fibrils. The fibrils form a three-dimensional network structure. The stretching improves the mechanical strength of the microporous membrane and expands its pores, making the multi-layer, microporous membrane suitable for battery separators.

Depending on the desired properties, stretching may be conducted with a temperature distribution in a thickness direction, to provide the multi-layer, microporous membrane with further improved mechanical strength. The detailed description of this method is given by Japanese Patent 3347854.

(6) Removal of Membrane-Forming Solvent

For the purpose of removing (washing away) the membrane-forming solvent, a washing solvent is used. Because the first and second polyolefin phases are separated from a membrane-forming solvent phase, the removal of the membrane-forming solvent provides a porous membrane constituted by fibrils forming a fine three-dimensional network structure and having pores communicating three-dimensionally and irregularly. Suitable washing solvents include, for instance, volatile solvents such as saturated hydrocarbons such as pentane, hexane, heptane, etc., chlorinated hydrocarbons such as methylene chloride, carbon tetrachloride, etc., ethers such as diethyl ether, dioxane, etc., ketones such as methyl ethyl ketone, etc., linear fluorocarbons such as trifluoroethane, $C_6F_{14}$, $C_7F_{16}$, etc., cyclic hydrofluorocarbons such as $C_5H_3F_7$, etc., hydrofluoroethers such as $C_4F_9OCH_3$, $C_4F_9OC_2H_5$, etc., perfluoroethers such as $C_4F_9OCF_3$, $C_4F_9OC_2F_5$, etc.

The washing of the multi-layer, gel-like sheet can be conducted by immersion in the washing solvent and/or the showering of the washing solvent. The washing solvent used is preferably 300-30,000 parts by mass per 100 parts by mass of the membrane. The washing temperature is usually 15-30° C., and if necessary, heating may be conducted during washing. The heating temperature during washing is preferably 80° C. or lower. Washing is preferably conducted until the amount of the remaining liquid solvent becomes less than 1% by mass of that added.

(7) Drying

The multi-layer, microporous membrane deprived of the membrane-forming solvent is dried by a heat-drying method, a wind-drying method, etc. The drying temperature is preferably equal to or lower than $Tcd_2$, particularly 5° C. or more lower than $Tcd_2$. Drying is conducted until the remaining washing solvent becomes preferably 5% or less by mass, more preferably 3% or less by mass, per 100% by mass (on a dry basis) of the multi-layer, microporous membrane. Insufficient drying undesirably leads to decrease in the porosity of the multi-layer, microporous membrane by the subsequent stretching and heat treatment, resulting in poor permeability.

(8) Stretching of Multi-Layer, Microporous Membrane

The dried multi-layer, microporous membrane is stretched (re-stretched) at least monoaxially. The stretching of the multi-layer, microporous membrane can be conducted while heating, by a tenter method, etc. like above. The stretching may be monoaxial or biaxial. In the case of biaxial stretching, any one of simultaneous biaxial stretching or sequential stretching may be used, though the simultaneous biaxial stretching is preferable. Incidentally, because the re-stretching is usually conducted on the multi-layer, microporous membrane in a long sheet form, which is obtained from the stretched multi-layer, gel-like sheet, the directions of MD and TD in the re-stretching is the same as those in the stretching of the multi-layer, gel-like sheet. This is true in other production methods.

The stretching temperature of the multi-layer, microporous membrane is preferably the melting point $Tm_2$ of the second polyethylene resin or lower, more preferably in a range of $Tcd_2$ to $Tm_2$. When the stretching temperature is higher than $Tm_2$, a melt viscosity is too low to conduct good stretching, resulting in low permeability. When the stretching temperature is lower than $Tcd_2$, the first and second polyethylene resins are so insufficiently softened that the membrane is likely to be broken by stretching, failing to achieve uniform stretching. Specifically, the stretching temperature is usually 90-135° C., preferably 95-130° C.

The monoaxial stretching magnification of the multi-layer, microporous membrane is preferably 1.1-1.8 folds. In the case of monoaxial stretching, it is 1.1-1.8 folds in a longitudinal or transverse direction. In the case of biaxial stretching, the multi-layer, microporous membrane may be stretched at the same or different magnifications, though preferably the same, as long as the stretching magnifications in both directions are within 1.1-1.8 folds.

With the multi-layer, microporous membrane stretched to 1.1-1.8 folds, the second polyethylene resin layer has a hybrid structure having a large average pore diameter. Because the percentage of the ultra-high-molecular-weight polyethylene is 8% or more by mass in the first polyethylene resin layer, the first polyethylene resin layer is not provided with a large average pore diameter unlike the second polyethylene resin layer, even if it is stretched to 1.1-1.8 folds.

When the stretching magnification of the multi-layer, microporous membrane is less than 1.1 folds, the second microporous layer does not have a hybrid structure, resulting in poor permeability, electrolytic solution absorption and electrolytic solution retention. When this magnification is more than 1.8 folds, too fine fibrils are formed, and the heat shrinkage resistance and the electrolytic solution retention are reduced. This stretching magnification is more preferably 1.2-1.6 folds.

(9) Heat Treatment

The dried multi-layer, microporous membrane is preferably heat-treated. The heat treatment stabilizes crystals, resulting in uniform lamella layers. The heat treatment may comprise heat-setting and/or annealing. The heat-setting is preferably conducted by a tenter method or a roll method. The heat-setting temperature is preferably in a range from $Tcd_2$ to $Tm_2$, more preferably in a range of the stretching temperature of the multi-layer, microporous membrane±5° C., most preferably in a range of the stretching (re-stretching) temperature of the multi-layer, microporous membrane±3° C.

The annealing is a heat treatment with no load applied to the multi-layer, microporous membrane, and may be conducted by using a heating chamber with a belt conveyer or an air-floating-type heating chamber. The annealing may be conducted continuously after the heat-setting with the tenter slackened. The annealing temperature is preferably $Tm_2$ or lower, more preferably in a range from 60° C. to $Tm_2$-5° C. Such annealing provides the multi-layer, microporous membrane with high permeability and strength.

(10) Cross-Linking

The multi-layer, microporous membrane may be cross-linked by ionizing radiation rays such as α-rays, β-rays, γ-rays, electron beams, etc. In the case of irradiating electron beams, the amount of electron beams is preferably 0.1-100 Mrad, and the accelerating voltage is preferably 100-300 kV. The cross-linking treatment elevates the meltdown temperature of the multi-layer, microporous membrane.

(11) Hydrophilizing Treatment

The multi-layer, microporous membrane may be subjected to a hydrophilizing treatment (treatment of imparting hydrophilic property). The hydrophilizing treatment may be a monomer-grafting treatment, a surfactant treatment, a corona-discharging treatment, etc. The monomer-grafting treatment is preferably conducted after the cross-linking treatment.

In the case of the surfactant treatment, any of nonionic surfactants, cationic surfactants, anionic surfactants and amphoteric surfactants may be used, and the nonionic surfactants are preferred. The multi-layer, microporous membrane is dipped in a solution of the surfactant in water or a lower alcohol such as methanol, ethanol, isopropyl alcohol, etc., or coated with the solution by a doctor blade method.

(B) Second Production Method

The second method for producing the multi-layer, microporous polyolefin membrane comprises the steps of (1) melt-blending a first polyolefin and a membrane-forming solvent to prepare a first polyolefin solution, (2) melt-blending a second polyolefin and a membrane-forming solvent to prepare a second polyolefin solution, (3) extruding the first and second polyolefin solutions through separate dies and immediately laminating them, (4) cooling the resultant laminate to form a multi-layer, gel-like sheet, (5) stretching the multi-layer, gel-like sheet, (6) removing the membrane-forming solvent from the multi-layer, gel-like sheet, (7) drying the multi-layer, microporous membrane, and (8) stretching the multi-layer, microporous membrane. After the step (8), if necessary, a heat treatment step (9), a step (10) of cross-linking with ionizing radiations, a hydrophilizing treatment step (11), etc. may be conducted.

Because the second method is the same as the first method except for the step (3), only the step (3) will be explained. The first and second polyolefin solutions are extruded in a sheet form through adjacent dies each connected to each of plural extruders, and immediately laminated while each solution is hot (for example, 100° C. or more). The other conditions may be the same as in the first method.

(C) Third Production Method

The third method for producing the multi-layer, microporous polyolefin membrane comprises the steps of (1) melt-blending a first polyolefin and a membrane-forming solvent to prepare a first polyolefin solution, (2) melt-blending a second polyolefin and a membrane-forming solvent to prepare a second polyolefin solution, (3) extruding the first polyolefin solution through one die to form a first extrudate, (4) extruding the second polyolefin solution through another die to form a second extrudate, (5) cooling both of the resultant first and second extrudates to form first and second gel-like sheets, (6) stretching each of the first and second gel-like sheets, (7) laminating the stretched first and second gel-like sheets, (8) removing the membrane-forming solvent from the resultant multi-layer, gel-like sheet, (9) drying the resultant multi-layer, microporous membrane, and (10) stretching the multi-layer, microporous membrane. Between the steps (7) and (8), a step (11) of stretching the multi-layer, gel-like sheet, etc. may be conducted. After the step (10), a heat treatment step (12), a step (13) of cross-linking with ionizing radiations, a hydrophilizing treatment step (14), etc. may be conducted.

The steps (1) and (2) may be the same as those in the first method, the steps (3) and (4) may be the same as in the first method except for extruding each of the first and second polyolefin solutions from a separate die, the step (5) may be the same as in the first method except for cooling the first and second gel-like sheets separately, the step (6) may be the same as in the first method except for stretching the first and second gel-like sheets separately, and the step (8)-(10) may be the same as in the first method. The steps (11)-(14) may be the same as described above.

In the stretching step (6), the stretching temperature of the first gel-like sheet is preferably in a range from the crystal dispersion temperature $Tcd_1$ of the first polyethylene resin to $Tcd_1+25°$ C., more preferably in a range from $Tcd_1+10°$ C. to $Tcd_1+25°$ C., most preferably in a range from $Tcd_1+15°$ C. to $Tcd_1+25°$ C. The stretching temperature of the second gel-like sheet is preferably in a range from the crystal dispersion temperature $Tcd_2$ of the second polyethylene resin to $Tcd_2+25°$ C., more preferably in a range from $Tcd_2+10°$ C. to $Tcd_2+25°$ C., most preferably in a range from $Tcd_2+15°$ C. to $Tcd_2+25°$ C.

The step (7) of laminating the stretched first and second gel-like sheets will be explained below. In the case of producing the three or more layer, microporous membrane, the stretched first and second gel-like sheets are laminated, such that at least both surface layers are constituted by the stretched first gel-like sheet, and that at least one layer between both surface layers is constituted by the stretched second gel-like sheet. The lamination method is not particularly restricted, but it is preferably a hot lamination method. The hot lamination method includes a heat-sealing method, an impulse sealing method, an ultrasonic lamination method, etc., and the heat-sealing method is preferable. Preferable as the heat-sealing method is a heat roll method, which heat-seals the overlapped first and second gel-like sheets through a pair of heat rolls. The heat-sealing temperature and pressure are not particularly restricted, as long as the gel-like sheets are fully bonded to provide a multi-layer, microporous membrane with undeteriorated properties. The heat-sealing temperature is, for instance, 90-135° C., preferably 90-115° C. The heat-sealing pressure is preferably 0.01-50 MPa. The thickness ratio of the first and second microporous layers can be controlled by adjusting the thickness of the first and second gel-like sheets. Stretching may be conducted while laminating, for instance, by passing the gel-like sheets through multi-stages of heat rolls.

(D) Fourth Production Method

The fourth method for producing the multi-layer, microporous polyolefin membrane comprises the steps of (1) melt-blending a first polyolefin and a membrane-forming solvent to prepare a first polyolefin solution, (2) melt-blending a second polyolefin and a membrane-forming solvent to prepare a second polyolefin solution, (3) extruding the first polyolefin solution through one die, (4) extruding the second polyolefin solution through another die, (5) cooling both of the resultant extrudates to form first and second gel-like sheets, (6) stretching each of the first and second gel-like sheets, (7) removing the membrane-forming solvent from each of the stretched first and second gel-like sheets, (8) drying each of the resultant first and second microporous polyolefin membranes, (9) stretching at least the second microporous polyolefin membrane, and (10) laminating the first and second microporous polyolefin membranes. If necessary, a heat treatment step (11) may be conducted between the steps (8) and (9). After the step (10), a step (12) of stretching the multi-layer, microporous membrane, a heat treatment step (13), a step (14) of cross-linking with ionizing radiations, a hydrophilizing treatment step (15), etc. may be conducted.

The steps (1) and (2) may be the same as in the first method, the steps (3) and (4) may be the same as in the first method except for extruding the first and second polyolefin solutions from separate dies, the step (5) may be the same as in the first method except for forming separate gel-like sheets, the step (6) may be the same as in the third method, the step (7) may be the same as in the first method except for removing the membrane-forming solvent from each gel-like sheet, and the step (8) may be the same as in the first method except for drying separate microporous membranes. The steps (12)-(15) may be the same as described above.

In the step (9), at least the second microporous polyolefin membrane is stretched. Its stretching temperature is preferably $Tm_2$ or lower, more preferably $Tcd_2$ to $Tm_2$. If necessary, the first microporous polyolefin membrane may be stretched. Its stretching temperature is preferably $Tm_1$ or lower, more preferably $Tcd_1$ to $Tm_1$. In any case of stretching the first and second microporous polyolefin membranes, the stretching magnification may be the same as in the first method, except that the unlaminated microporous membranes are stretched.

The step (10) of laminating the stretched first and second microporous polyolefin membranes will be explained below. In the case of producing the three or more layer, microporous membrane, the first and second microporous membranes are laminated, such that at least both surface layers are constituted by the first microporous polyolefin membrane, and that at least one layer between both surface layers is constituted by the stretched second microporous polyolefin membrane. The lamination method is not restricted but preferably a hot lamination method, preferably a heat-sealing method, like in the step of laminating the gel-like sheets in the third method. The heat-sealing temperature is, for instance, 90-135° C., preferably 90-115° C. The heat-sealing pressure is preferably 0.01-50 MPa. Stretching may be conducted while laminating, for instance, by passing the gel-like sheets through multi-stages of heat rolls.

In the heat treatment step (11), the heat-setting temperature of the first microporous membrane is preferably $Tcd_1$ to $Tm_1$. The annealing temperature of the first microporous membrane is preferably $Tm_1$ or lower, more preferably 60° C. to $Tm_1$-5° C. The heat-setting temperature of the second microporous membrane is preferably $Tcd_2$ to $Tm_2$, more preferably the stretching temperature of the microporous membrane±5° C., most preferably the stretching temperature of the microporous membrane±3° C. The annealing temperature of the second microporous membrane is preferably $Tm_2$ or lower, more preferably 60° C. to $Tm_2$-5° C.

[3] Structure and Properties of Multi-Layer, Microporous Polyolefin Membrane (A) First Microporous Layer (1) Average Pore Diameter The average pore diameter of the first microporous layer is 0.005-0.1 µm, preferably 0.01-0.05 µm.

(2) Number of Layers

In the case of the three or more layer structure, the first microporous layers need only constitute at least both surface layers. In the case of the four or more layer structure, the multi-layer, microporous polyolefin membrane may have three or more first microporous layers, if necessary. For instance, a first microporous layer having a different composition from that of both surface layers may be provided between both surface layers.

(3) Function of First Microporous Layer

With both surface layers constituted by the first microporous layer, the multi-layer, microporous polyolefin membrane is provided with high mechanical strength, meltdown properties and electrolytic solution retention.

(B) Second Microporous Layer (1) Average Pore Diameter

The average pore diameter of the second microporous layer is 0.02-0.5 µm, preferably 0.02-0.1 µm.

(2) Structure

The second microporous layer has a hybrid structure that its pore diameter distribution curve obtained by mercury intrusion porosimetry has at least two peaks, a main peak and at least one sub-peak, as shown in FIG. 1. The main peak is in a pore diameter range of 0.01-0.08 µm, and the sub-peak is in a pore diameter range of more than 0.08 µm and 1.5 µm or less. The main peak represents dense domains, and the sub-peaks represent coarse domains. The second microporous layer has a larger average pore diameter than the first microporous layer because of the existence of the coarse domains. The hybrid structure is derived from the second polyethylene resin. When the percentage of the ultra-high-molecular-weight polyethylene is more than 7% by mass, the hybrid structure is not formed, resulting in poor electrolytic solution absorption.

In a preferred example of the second microporous layer, the dense domains have a main peak (first peak) in a pore diameter range of about 0.04-0.07 µm, and the coarse domains have at least a second peak in a pore diameter range of about 0.1-0.11 µm, a third peak at a pore diameter of about 0.7 µm, and a fourth peak in a pore diameter range of about 1-1.1 µm. However, the sub-peaks need not have the third and fourth peaks. FIG. 1 shows an example of the measured pore diameter distribution curve. In this example, the first to fourth peaks are located at about 0.06 µm, about 0.1 µm, about 0.7 µm, and about 1.1 µm, respectively.

The pore volume ratio of the dense domains to the coarse domains is determined by $S_1$ and $S_2$ shown in FIG. 1. A hatched area $S_1$ on the smaller diameter side than a vertical line $L_1$ passing the first peak corresponds to the pore volume of the dense domains, and a hatched area $S_2$ on the larger diameter side than a vertical line $L_2$ passing the second peak corresponds to the pore volume of the coarse domains. The pore volume ratio $S_1/S_2$ of the dense domains to the coarse domains is preferably 0.5-49, more preferably 0.6-10, most preferably 0.7-2.

Though not restricted, dense domains and coarse domains are irregularly entangled to form a hybrid structure in any cross sections of the second microporous layer viewed in longitudinal and transverse directions. The hybrid structure can be observed by a transmission electron microscope (TEM), etc.

(3) Number of Layers

In the case of the three or more layer structure, the multi-layer, microporous polyolefin membrane may have at least one second microporous layer. In the case of the four or more layer structure, the multi-layer, microporous polyolefin membrane may have pluralities of second microporous layers, if necessary. Pluralities of second microporous layers may have different compositions.

(4) Function of Second Microporous Layer

The second microporous layer has a larger average pore diameter than that of the first microporous layer. Accordingly, when there is at least one second microporous layer between both surface layers, the multi-layer, microporous polyolefin membrane has high permeability and electrolytic solution absorption.

(C) Average Pore Diameter Ratio

The average pore diameter ratio of the first microporous layer to the second microporous layer is preferably more than 1/1 to 10/1 or less, more preferably 1.5/1-5/1.

(D) Arrangement and Ratio of First and Second Microporous Layers

The arrangement of the first and second microporous layers in the multi-layer, microporous polyolefin membrane is divided roughly into (i) a two-layer structure of the first microporous layer and the second microporous layer, and (ii) a three or more layer structure of first microporous layers constituting both surface layers, and at least one second microporous layer disposed between both surface layers. As described above, in the case of the three or more layer structure, as long as at least one second microporous layer is disposed between both surface layers, in addition, one or both of the first and second microporous layers may be disposed between both surface layers. In the case of disposing plural microporous layers between both surface layers, the arrangement of the plural microporous layers is not particularly restricted. Though not restrictive, the multi-layer, microporous polyolefin membrane preferably has a three-layer structure of first microporous layer/second microporous layer/first microporous layer.

The total thickness of the first microporous layers (the thickness of the first microporous layer in the case of the two layer structure) is preferably 15-60% per 100% of the total thickness of the first and second microporous layers. When this ratio is less than 15%, the multi-layer, microporous polyolefin membrane has low meltdown properties. When it is more than 60%, the multi-layer, microporous polyolefin membrane has low permeability, electrolytic solution absorption and electrolytic solution retention. This ratio is more preferably 15-50%. In the case of the three-layer structure, the thickness ratio of first microporous layer/second microporous layer/first microporous layer is preferably 0.08/0.84/0.08 to 0.3/0.4/0.3, more preferably 0.1/0.8/0.1 to 0.25/0.5/0.25.

(E) Properties

The multi-layer, microporous polyolefin membrane has the following properties.

(1) Air Permeability of 20-400 Seconds/100 cm³ (Converted to the Value at 20-μm Thickness)

When the air permeability measured according to JIS P8117 is 20-400 seconds/100 cm³, batteries with separators formed by the multi-layer, microporous membrane have large capacity and good cyclability. When the air permeability is less than 20 seconds/100 cm³, shutdown does not sufficiently occur when the temperatures inside the batteries are elevated. Air permeability $P_1$ measured on a multi-layer, microporous membrane having a thickness $T_1$ according to JIS P8117 is converted to air permeability $P_2$ at a thickness of 20 μm by the equation of $P_2 = (P_1 \times 20)/T_1$.

(2) Porosity of 25-80%

When the porosity is less than 25%, the multi-layer, microporous membrane does not have good air permeability. When the porosity exceeds 80%, battery separators formed by the multi-layer, microporous membrane have insufficient strength, resulting in large likelihood of the short-circuiting of electrodes.

(3) Pin Puncture Strength of 2,000 mN or More (Converted to the Value at 20-μm Thickness)

The pin puncture strength (converted to the value at 20-μm thickness) of the multi-layer, microporous membrane is represented by the maximum load measured when the multi-layer, microporous membrane is pricked with a needle of 1 mm in diameter with a spherical end surface (radius R of curvature: 0.5 mm) at a speed of 2 mm/second. When the pin puncture strength is less than 2,000 mN/20 μm, short-circuiting is likely to occur in batteries with separators formed by the multi-layer, microporous membrane.

(4) Tensile Rupture Strength of 49,000 kPa or More

With tensile rupture strength of 49,000 kPa or more in both longitudinal and transverse directions according to ASTM D882, the multi-layer, microporous polyolefin membrane is unlikely to be broken when used as a battery separator. The tensile rupture strength is preferably 80,000 kPa or more.

(5) Tensile Rupture Elongation of 100% or More

With tensile rupture elongation of 100% or more in both longitudinal and transverse directions according to ASTM D882, the multi-layer, microporous polyolefin membrane is unlikely to be broken when used as a battery separator.

(6) Heat Shrinkage Ratio of 12% or Less

When the heat shrinkage ratio after exposed to 105° C. for 8 hours exceeds 12% in both longitudinal and transverse directions, heat generated in batteries with separators formed by the multi-layer, microporous membrane causes the shrinkage of the separators, making it highly likely that short-circuiting occurs on the edges of the separators.

(7) Meltdown Temperature of 150° C. or Higher

Figure 2:
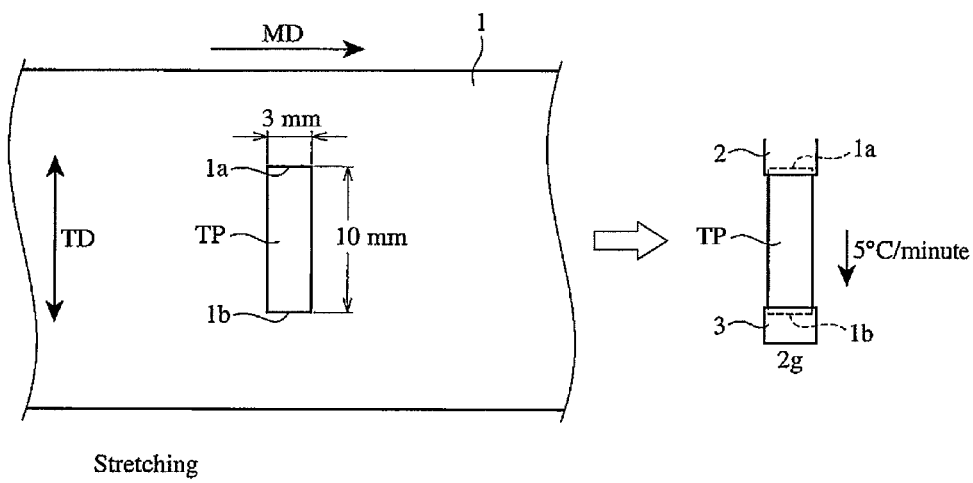
FIG. 2 is a schematic view showing a method for measuring a meltdown temperature.

The meltdown temperature of the multi-layer, microporous polyolefin membrane is 150° C. or higher, preferably 150-190° C. The meltdown temperature is determined as follows: As shown in FIG. 2, a test piece TP having a size of 3 mm and 10 mm in the stretching directions MD and TD, respectively, is cut out of a multi-layer, microporous polyolefin membrane 1, and the test piece TP is heated from room temperature at a speed of 5° C./minute, with its upper end 1a gripped by a holder 2 and a weight 3 of 2 g attached to its lower end 1b. A temperature at which the test piece TP elongates by 50% of its length (100%) at room temperature is defined as the meltdown temperature.

[4] Battery Separator

The battery separator formed by the above multi-layer, microporous polyolefin membrane preferably has a thickness of 3-200 μm, more preferably 5-50 μm, most preferably 10-35 μm, though properly selectable depending on the types of batteries.

[5] Battery

The multi-layer, microporous polyolefin membranes of the present invention may be used as separators for secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, particularly for lithium ion secondary batteries. Explanations will be made below on the lithium ion secondary batteries. However, the invention is not limited to lithium-ion secondary batteries.

The lithium secondary battery comprises a cathode and an anode laminated via a separator, and the separator contains an electrolytic solution (electrolyte). The electrode may have a known structure, not particularly restricted. The electrode structure may be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises a current collector, and a cathodic active material layer capable of absorbing and discharging lithium ions, which is formed on the current collector. The cathodic active materials may be inorganic compounds such as transition metal oxides, composite oxides of lithium and transition metals (lithium composite oxides), transition metal sulfides, etc. The transition metals may be V, Mn, Fe, Co, Ni, etc. Preferred examples of the lithium composite oxides are lithium nickelate, lithium cobaltate, lithium manganate, laminar lithium composite oxides based on α-$NaFeO_2$, etc. The anode comprises a current collector, and a negative-electrode active material layer formed on the current collector. The negative-electrode active materials may be carbonaceous materials such as natural graphite, artificial graphite, cokes, carbon black, etc.

The electrolytic solutions are obtained by dissolving lithium salts in organic solvents. The lithium salts may be $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, lower aliphatic carboxylates of lithium, $LiAlCl_4$, etc. The lithium salts may be used alone or in combination. The organic solvents may be organic solvents having high boiling points and high dielectric constants such as ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents may be used alone or in combination. Because the organic solvents having high dielectric constants have high viscosity, while those having low viscosity have low dielectric constants, their mixtures are preferably used.

When the battery is assembled, the separator is impregnated with the electrolytic solution, so that the separator (multi-layer, microporous membrane) is provided with ion permeability. The impregnation treatment is usually conducted by immersing the multi-layer, microporous membrane in the electrolytic solution at room temperature. When a cylindrical battery is assembled, for instance, a cathode sheet, a separator formed by the multi-layer, microporous membrane and an anode sheet are laminated in this order, and the resultant laminate is wound to a toroidal-type electrode assembly. The resultant electrode assembly is charged into a battery can and then impregnated with the above electrolytic solution, and a battery lid acting as a cathode terminal provided with a safety valve is caulked to the battery can via a gasket to produce a battery.

The present invention will be explained in more detail referring to Examples below without intention of restricting the scope of the present invention.

Example 1

(1) Preparation of First Polyolefin Solution

Dry-blended were 100 parts by mass of a first polyethylene composition comprising 30% by mass of ultra-high-molecular-weight polyethylene (UHMWPE) having a weight-average molecular weight (Mw) of $2.0 \times 10^6$, and 70% by mass of high-density polyethylene (HDPE) having Mw of $3.5 \times 10^5$ and Mw/Mn of 13.5, and 0.2 parts by mass of tetrakis[methylene-3-(3,5-ditertiary-butyl-4-hydroxyphenyl)-propionate]methane as an antioxidant. The first polyethylene composition had a melting point of 135° C., and a crystal dispersion temperature of 100° C. 35 parts by mass of the resultant mixture was charged into a strong-blending double-screw extruder having an inner diameter of 58 mm and L/D of 52.5, and 65 parts by mass of liquid paraffin [50 cst (40° C.)] was supplied to the double-screw extruder via a side feeder. Melt-blending was conducted at 230° C. and 250 rpm to prepare a first polyolefin solution.

(2) Preparation of Second Polyolefin Solution

Dry-blended were 100 parts by mass of a second polyethylene composition having Mw of $3.3 \times 10^5$, which comprised 2% by mass of the above UHMWPE and 98% by mass of HDPE having Mw of $3.0 \times 10^5$ and Mw/Mn of 8.6, and 0.2 parts by mass of tetrakis[methylene-3-(3,5-ditertiary-butyl-4-hydroxyphenyl)-propionate]methane as an antioxidant. 35 parts by mass of the resultant mixture was charged into the same strong-blending double-screw extruder as above, and 65 parts by mass of the same liquid paraffin as above was supplied to the double-screw extruder via a side feeder. Melt-blending was conducted at 230° C. and 250 rpm to prepare a second polyolefin solution.

The Mw and Mw/Mn of each UHMWPE and HDPE were measured by a gel permeation chromatography (GPC) method under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and Calibration curve: Produced from a calibration curve of a single-dispersion, standard polystyrene sample using a predetermined conversion constant.

(3) Production of Microporous Membrane

The first and second polyolefin solutions were supplied from their double-screw extruders to a three-layer-sheet-forming T-die, from which a laminate of first solution layer/second solution layer/first solution layer at a thickness ratio of 0.2/0.6/0.2 was extruded. The extrudate was cooled while passing through cooling rolls controlled at 15° C., to form a three-layer, gel-like sheet. Using a tenter-stretching machine, the three-layer, gel-like sheet was simultaneously biaxially stretched at 117° C. to 5 folds in both longitudinal and transverse directions. The stretched three-layer, gel-like sheet was fixed to an aluminum frame of 20 cm×20 cm, and immersed in a bath of methylene chloride controlled at 25° C. to remove the liquid paraffin with vibration of 100 rpm for 3 minutes. The resultant membrane was air-cooled at room temperature. The dried membrane was re-stretched by a batch-stretching machine to a magnification of 1.2 folds in a transverse direction at 128° C. The re-stretched membrane, which remained fixed to the batch-stretching machine, was heat-set at 128° C. for 10 minutes to produce a three-layer, microporous polyolefin membrane.

Example 2

(1) Preparation of First Polyolefin Solution

A first polyolefin solution was prepared in the same manner as in Example 1 except for using a composition comprising 10% by mass of UHMWPE, 85% by mass of HDPE having Mw of $3.0\times10^5$ and Mw/Mn of 8.6, and 5% by mass of a propylene homopolymer (PP) having Mw of $5.3\times10^5$. The Mw of PP was measured by a GPC method as above.

(2) Preparation of Second Polyolefin Solution

The second polyolefin solution was prepared in the same manner as in Example 1.

(3) Production of Microporous Membrane

A three-layer, microporous polyolefin membrane was produced in the same manner as in Example 1, except that the first and second polyolefin solutions were extruded at a thickness ratio of first solution layer/second solution layer/first solution layer=0.1/0.8/0.1, and that the multi-layer, microporous membrane was stretched and heat-set at 127.5° C.

Example 3

(1) Preparation of First Polyolefin Solution

The first polyolefin solution was prepared in the same manner as in Example 1.

(2) Preparation of Second Polyolefin Solution

The second polyolefin solution was prepared in the same manner as in Example 1 except for using a composition comprising 95% by mass of HDPE and 5% by mass of PP having Mw of $5.3\times10^5$.

(3) Production of Microporous Membrane

A three-layer, microporous polyolefin membrane was produced in the same manner as in Example 1, except that the stretching temperature of the multi-layer, gel-like sheet was 116° C., and that the stretching and heat-setting temperatures of the multi-layer, microporous membrane were 127° C.

Example 4

(1) Preparation of First Polyolefin Solution

A first polyolefin solution was prepared in the same manner as in Example 1 except for using only UHMWPE having Mw of $1.0\times10^6$ and Mw/Mn of 8.

(2) Preparation of Second Polyolefin Solution

A second polyolefin solution was prepared in the same manner as in Example 1 except for using HDPE having Mw of $3.0\times10^5$ and Mw/Mn of 8.6.

(3) Production of Microporous Membrane

A three-layer, microporous polyolefin membrane was produced in the same manner as in Example 1, except that the thickness ratio of first solution layer/second solution layer/first solution layer was 0.1/0.8/0.1, and that the stretching and heat-setting temperatures of the multi-layer, microporous membrane were 127° C.

Example 5

(1) Preparation of First Polyolefin Solution

A first polyolefin solution was prepared in the same manner as in Example 2 except for using a composition comprising 20% by mass of UHMWPE, 75% by mass of HDPE and 5% by mass of PP.

(2) Preparation of Second Polyolefin Solution

A second polyolefin solution was prepared in the same manner as in Example 3.

(3) Production of Microporous Membrane

Example 1 was repeated until the drying step, except that the thickness ratio of first solution layer/second solution layer/first solution layer was 0.1/0.8/0.1. A three-layer, microporous polyolefin membrane was produced from the resultant membrane in the same manner as in Example 1, except that the resultant membrane was re-stretched at 127° C. to 1.2 folds in a transverse direction, annealed at 127° C. until it shrank to the size before re-stretching, and heat-set at 127° C. for 10 minutes.

Example 6

(1) Preparation of First Polyolefin Solution

A first polyolefin solution was prepared in the same manner as in Example 1 except for using a composition of 10% by mass of UHMWPE, 70% by mass of HDPE having Mw of $3.0\times10^5$ and Mw/Mn of 8.6, and 20% by mass of PP having Mw of $2.0\times10^6$.

(2) Preparation of Second Polyolefin Solution

A second polyolefin solution was prepared in the same manner as in Example 4.

(3) Production of Microporous Membrane

Example 1 was repeated until the drying step, except that the thickness ratio of first solution layer/second solution layer/first solution layer was 0.1/0.8/0.1. A three-layer, microporous polyolefin membrane was produced from the resultant membrane in the same manner as in Example 1, except that the membrane was re-stretched at 127° C. to 1.3 folds in a transverse direction, and heat-set at 127° C. for 10 minutes.

Example 7

(1) Preparation of First Polyolefin Solution

A first polyolefin solution was prepared in the same manner as in Example 1.

(2) Preparation of Second Polyolefin Solution

A second polyolefin solution was prepared in the same manner as in Example 1 except for using a composition comprising 95% by mass of HDPE and 5% by mass of PP having Mw of $2.0\times10^6$.

(3) Production of Microporous Membrane

A three-layer, microporous polyolefin membrane was produced in the same manner as in Example 1, except that the re-stretching temperature and the heat-setting temperature were both 127° C.

Comparative Example 1

A microporous polyolefin membrane was produced in the same manner as in Example 1, except that only a first polyolefin solution having a concentration of 25% by mass was used, that the gel-like sheet was stretched at 115° C., and that the microporous membrane was heat-set at 128° C. without stretching.

Comparative Example 2

A three-layer, microporous polyolefin membrane was produced in the same manner as in Example 1, except that the first and second polyolefin solutions were extruded at a thickness ratio of first solution layer/second solution layer/first solution layer=0.4/0.2/0.4, that the stretching temperature of the multi-layer, gel-like sheet was 118° C., and that the stretching and heat-setting temperatures of the multi-layer, microporous membrane were 126° C.

Comparative Example 3

A three-layer, microporous polyolefin membrane was produced in the same manner as in Example 1, except that the first and second polyolefin solutions were extruded at a thickness ratio of second solution layer/first solution layer/second solution layer=0.2/0.6/0.2, and that the stretching and heat-setting temperatures of the multi-layer, microporous membrane were 127° C.

Comparative Example 4

A microporous polyethylene membrane was produced in the same manner as in Example 1, except that only the second polyolefin solution was used, that the gel-like sheet was stretched at 118.5° C., and that the microporous membrane was stretched and heat-set at 127° C.

Comparative Example 5

A three-layer, microporous polyolefin membrane was produced in the same manner as in Example 1, except that a first polyolefin comprising 10% by mass of UHMWPE and 90% by mass of HDPE to have Mw of $4.7\times10^5$ was used in place of the second polyolefin, and that the microporous membrane was stretched and heat-set both at 127° C.

Comparative Example 6

A three-layer, microporous polyolefin membrane was produced in the same manner as in Example 3, except that the gel-like sheet was stretched at 115° C., and that the microporous membrane was heat-set at 126° C. without stretching.

Comparative Example 7

A three-layer, microporous polyolefin membrane was produced in the same manner as in Example 1, except that the microporous membrane was re-stretched to 1.9 folds at 131° C. and heat-set at 131° C.

The properties of the (triple-layer) microporous polyolefin membranes obtained in Examples 1-7 and Comparative Examples 1-7 were measured by the following methods. The results are shown in Table 1.

(1) Average Thickness (μm)

The thickness of each (triple-layer) microporous polyolefin membrane was measured by a contact thickness meter at 6-cm longitudinal intervals over the width of 30 cm, and averaged.

(2) Layer Thickness Ratio

Three membranes obtained by peeling each three-layer, microporous membrane were measured with respect to thickness by a contact thickness meter over a width of 30 cm at a longitudinal interval of 10 mm, and the measured thickness was averaged. The thickness ratio was calculated from the average thickness of each membrane.

(3) Air Permeability (sec/100 cm³/20 μm)

Air permeability $P_1$ measured on each (triple-layer) microporous membrane having a thickness $T_1$ according to JIS P8117 was converted to air permeability $P_2$ at a thickness of 20 μm by the equation of $P_2=(P_1\times20)/T_1$.

(4) Porosity (%)

Measured by a weight method.

(5) Pin Puncture Strength (mN/20 μm)

The maximum load was measured, when each triple-layer, microporous membrane having a thickness of $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the equation of $L_2=(L_1\times20)/T_1$, and used as pin puncture strength.

(6) Tensile Rupture Strength and Tensile Rupture Elongation

Measured on a 10-mm-wide rectangular test piece according to ASTM D882.

(7) Heat Shrinkage Ratio (%)

The shrinkage ratios of each (triple-layer) microporous membrane in both longitudinal and transverse directions were measured three times when exposed to 105° C. for 8 hours, and averaged to determine the heat shrinkage ratio.

(8) Meltdown Temperature (° C.)

Using a thermomechanical analyzer (TMA/SS6000 available from Seiko Instruments Inc.), a test piece TP of 10 mm (TD) and 3 mm (MD) was heated from room temperature at a speed of 5° C./minute under a load of 2 g according to the method shown in FIG. 2. The temperature at which the test piece TP elongated by 50% of its length (100%) at room temperature was used as "meltdown temperature."

(9) Average Pore Diameters of Surface and Inner Layers

Three membranes obtained by peeling the three-layer, microporous membrane were measured with respect to average pore diameter by a mercury intrusion porosimetry (measuring device: Poresizer Type 9320, manufactured by Micromeritics Ltd.). The average pore diameters of the two membranes constituting the surface layers were averaged to determine the average pore diameter of the surface layer.

(10) Pore Diameter Distribution of Inner Layer

The pore diameter distribution of an inner-layer membrane constituting the three-layer, microporous membrane was determined from a pore diameter distribution curve obtained by mercury intrusion porosimetry.

(11) Pore Volume Ratio in Inner Layer

Calculated from $S_1/S_2$ shown in FIG. 1.

(12) Electrolytic Solution Absorption Speed

Using a dynamic-surface-tension-measuring apparatus (DCAT21 with high-precision electronic balance, available from Eko Instruments Co., ltd.), a triple-layer, microporous membrane sample was immersed in an electrolytic solution (electrolyte: 1 mol/L of $LiPF_6$, solvent: ethylene carbonate/dimethyl carbonate at a volume ratio of 3/7) kept at 18° C., to determine an electrolytic solution absorption speed by the formula of [weight increment (g) of microporous membrane/weight (g) of microporous membrane before absorption]. The electrolytic solution absorption speed is expressed by a relative value, assuming that the electrolytic solution absorption speed of the microporous membrane of Comparative Example 1 is 1.

(13) Liquid-Retaining Ratio Under Pressure

The microporous membrane sample (width 60 mm, length 100 mm) was impregnated with γ-butyrolactone to saturation, to measure the amount A (g/g) of the liquid retained per a unit weight of the sample before pressing. A filter paper and an aluminum foil were laminated in this order on each surface of the liquid-absorbed sample. The resultant laminate was sandwiched by a pair of plate jigs, and pressed at 1.96 MPa (20 kgf/cm²) and 60° C. for 5 minutes. The amount B (g/g) of the liquid retained per a unit weight of the sample after pressing was measured in the same manner as above. A liquid-retaining ratio (B/A) per a unit sample weight was calculated as an index of liquid retention. The liquid-retaining ratio is expressed by a relative value, assuming that the liquid-retaining ratio of the membrane of Comparative Example 1 is 1.

TABLE 1

| | | No. | | |
|---|---|---|---|---|
| | | Example 1 | Example 2 | Example 3 |
| First Polyethylene Resin | | | | |
| UHMWPE | $Mw^{(1)}/MWD^{(2)}$/% by mass | $2.0 \times 10^6/8/30$ | $2.0 \times 10^6/8/10$ | $2.0 \times 10^6/8/30$ |
| HDPE | Mw/MWD/% by mass | $3.5 \times 10^5/13.5/70$ | $3.0 \times 10^5/8.6/85$ | $3.5 \times 10^5/13.5/70$ |
| PP | Mw/% by mass | —/— | $5.3 \times 10^5/5$ | —/— |
| Second Polyethylene Resin | | | | |
| UHMWPE | Mw/MWD/% by mass | $2.0 \times 10^6/8/2$ | $2.0 \times 10^6/8/2$ | —/—/— |
| HDPE | Mw/MWD/% by mass | $3.0 \times 10^5/8.6/98$ | $3.0 \times 10^5/8.6/98$ | $3.0 \times 10^5/8.6/95$ |
| Mw of PE Composition | | $3.3 \times 10^5$ | $3.3 \times 10^5$ | — |
| PP | Mw/% by mass | —/— | —/— | $5.3 \times 10^5/5$ |
| Production Conditions | | | | |
| Concentration$^{(3)}$ (% by mass) | | 35/35 | 35/35 | 35/35 |
| Simultaneous Extrusion | | | | |
| Layer Structure$^{(4)}$ | | (I)/(II)/(I) | (I)/(II)/(I) | (I)/(II)/(I) |
| Layer Thickness Ratio$^{(5)}$ | | 0.2/0.6/0.2 | 0.1/0.8/0.1 | 0.2/0.6/0.2 |
| Stretching of Multi-Layer, Gel-Like Sheet | | | | |
| Temperature (° C.) | | 117 | 117 | 116 |
| Magnification (MD × TD) | | 5 × 5 | 5 × 5 | 5 × 5 |
| Stretching of Multi-Layer, Microporous Membrane | | | | |
| Temp. (° C.)/Direction/Magnification (folds) | | 128/TD/1.2 | 127.5/TD/1.2 | 127/TD/1.2 |
| Annealing | | | | |
| Temp. (° C.)/Shrinking Direction/Shrinking Ratio (folds) | | —/—/— | —/—/— | —/—/— |
| Heat-Setting | | | | |
| Temperature (° C.)/Time (minute) | | 128/10 | 127.5/10 | 127/10 |
| Properties of Multi-Layer, Microporous Membrane | | | | |
| Average Thickness (μm) | | 20.2 | 20.1 | 19.8 |
| Layer Thickness Ratio$^{(5)}$ | | 0.2/0.6/0.2 | 0.1/0.8/0.1 | 0.2/0.6/0.2 |
| Air Permeability (sec/100 cm³/20 μm) | | 252 | 302 | 319 |
| Porosity (%) | | 36.9 | 39 | 37.1 |
| Pin Puncture Strength (mN/20 μm) | | 3,978.8 | 4,341.4 | 4,116 |
| Tensile Rupture Strength (kPa) in MD/TD | | 143,080/155,820 | 122,500/134,260 | 142,100/154,840 |
| Tensile Rupture Elongation (%) in MD/TD | | 160/180 | 150/175 | 150/165 |
| Heat Shrinkage Ratio (%) in MD/TD | | 2.5/2.5 | 3.5/3.6 | 3.5/3.5 |
| Meltdown Temperature (° C.) | | 152 | 150 | 152 |
| Higher-Order Structure | | | | |
| Average Pore Diameter (μm) in S/I$^{(6)}$ | | 0.02/0.05 | 0.025/0.05 | 0.02/0.06 |
| Average Pore Diameter Ratio$^{(7)}$ | | 2.5 | 2 | 3 |

TABLE 1-continued

| | | | | |
|---|---|---|---|---|
| Peaks (μm) in Pore Diameter Distribution[8] | 0.04/0.1/0.7/1 | 0.04/0.1/0.7/1 | 0.06/0.1/—/— |
| Pore Volume Ratio[9] | 1.3 | 1.3 | 1.3 |
| Electrolytic solution Absorption Speed | 2.5 | 2.7 | 2.5 |
| Liquid-Retaining Ratio Under Pressure | 1 | 0.9 | 1 |

| | | No. | | |
|---|---|---|---|---|
| | | Example 4 | Example 5 | Example 6 |
| First Polyethylene Resin | | | | |
| UHMWPE | $M_w$[1]/MWD[2]/% by mass | $1.0 \times 10^6$/8/100 | $2.0 \times 10^6$/8/20 | $2.0 \times 10^6$/8/10 |
| HDPE | $M_w$/MWD/% by mass | —/—/— | $3.0 \times 10^5$/8.6/75 | $3.0 \times 10^5$/8.6/70 |
| PP | $M_w$/% by mass | —/— | $5.3 \times 10^5$/5 | $2.0 \times 10^6$/20 |
| Second Polyethylene Resin | | | | |
| UHMWPE | $M_w$/MWD/% by mass | —/—/— | —/—/— | —/—/— |
| HDPE | $M_w$/MWD/% by mass | $3.0 \times 10^5$/8.6/100 | $3.0 \times 10^5$/8.6/95 | $3.0 \times 10^5$/8.6/100 |
| $M_w$ of PE Composition | | — | — | — |
| PP | $M_w$/% by mass | —/— | $5.3 \times 10^5$/5 | —/— |
| Production Conditions | | | | |
| Concentration[3] (% by mass) | | 35/35 | 35/35 | 35/35 |
| Simultaneous Extrusion | | | | |
| Layer Structure[4] | | (I)/(II)/(I) | (I)/(II)/(I) | (I)/(II)/(I) |
| Layer Thickness Ratio[5] | | 0.1/0.8/0.1 | 0.1/0.8/0.1 | 0.1/0.8/0.1 |
| Stretching of Multi-Layer, Gel-Like Sheet | | | | |
| Temperature (° C.) | | 117 | 117 | 117 |
| Magnification (MD × TD) | | 5 × 5 | 7 × 5 | 5 × 5 |
| Stretching of Multi-Layer, Microporous Membrane | | | | |
| Temp. (° C.)/Direction/Magnification (folds) | | 127/TD/1.2 | 127/TD/1.2 | 127/TD/1.3 |
| Annealing | | | | |
| Temp. (° C.)/Shrinking Direction/Shrinking Ratio (folds) | | —/—/— | 127/TD/0.83 | —/—/— |
| Heat-Setting | | | | |
| Temperature (° C.)/Time (minute) | | 127/10 | 127/10 | 127/10 |
| Properties of Multi-Layer, Microporous Membrane | | | | |
| Average Thickness (μm) | | 19.9 | 20.3 | 21.5 |
| Layer Thickness Ratio[5] | | 0.1/0.8/0.1 | 0.1/0.8/0.1 | 0.1/0.8/0.1 |
| Air Permeability (sec/100 cm³/20 μm) | | 198 | 192 | 354 |
| Porosity (%) | | 41.3 | 39.5 | 39 |
| Pin Puncture Strength (mN/20 μm) | | 3,822 | 3,577 | 4,116 |
| Tensile Rupture Strength (kPa) in MD/TD | | 121,520/131,320 | 117,600/117,600 | 132,300/144,060 |
| Tensile Rupture Elongation (%) in MD/TD | | 170 | 150 | 145 |
| | | 190 | 155 | 165 |
| Heat Shrinkage Ratio (%) in MD/TD | | 3.8/3.9 | 3.8/1.6 | 4.4/3.5 |
| Meltdown Temperature (° C.) | | 153 | 150 | 167 |
| Higher-Order Structure | | | | |
| Average Pore Diameter (μm) in S/I[6] | | 0.02/0.05 | 0.025/0.06 | 0.02/0.05 |
| Average Pore Diameter Ratio[7] | | 2.5 | 2.4 | 2.5 |
| Peaks (μm) in Pore Diameter Distribution[8] | | 0.06/0.1/0.7/— | 0.06/0.1/—/— | 0.05/0.1/0.7/— |
| Pore Volume Ratio[9] | | 1.4 | 1.3 | 1.4 |
| Electrolytic solution Absorption Speed | | 2.6 | 2.6 | 2.2 |
| Liquid-Retaining Ratio Under Pressure | | 0.9 | 0.9 | 0.9 |

| | | No. | | |
|---|---|---|---|---|
| | | Example 7 | Com. Ex. 1 | Com. Ex. 2 |
| First Polyethylene Resin | | | | |
| UHMWPE | $M_w$[1]/MWD[2]/% by mass | $2.0 \times 10^6$/8/30 | $2.0 \times 10^6$/8/30 | $2.0 \times 10^6$/8/30 |
| HDPE | $M_w$/MWD/% by mass | $3.5 \times 10^5$/13.5/70 | $3.0 \times 10^5$/8.6/70 | $3.5 \times 10^5$/13.5/70 |
| PP | $M_w$/% by mass | —/— | —/— | —/— |
| Second Polyethylene Resin | | | | |
| UHMWPE | $M_w$/MWD/% by mass | —/—/— | —/—/— | $2.0 \times 10^6$/8/2 |
| HDPE | $M_w$/MWD/% by mass | $3.0 \times 10^5$/8.6/95 | —/—/— | $3.0 \times 10^5$/8.6/98 |
| $M_w$ of PE Composition | | — | — | $3.4 \times 10^5$ |
| PP | $M_w$/% by mass | $2.0 \times 10^6$/5 | —/— | —/— |

TABLE 1-continued

| Production Conditions | | | |
|---|---|---|---|
| Concentration[3] (% by mass) Simultaneous Extrusion | 35/35 | 25/— | 35/35 |
| Layer Structure[4] | (I)/(II)/(I) | — | (I)/(II)/(I) |
| Layer Thickness Ratio[5] | 0.2/0.6/0.2 | — | 0.4/0.2/0.4 |
| Stretching of Multi-Layer, Gel-Like Sheet | | | |
| Temperature (° C.) | 117 | 115 | 118 |
| Magnification (MD × TD) | 5 × 5 | 5 × 5 | 5 × 5 |
| Stretching of Multi-Layer, Microporous Membrane | | | |
| Temp. (° C.)/Direction/Magnification (folds) | 127/TD/1.2 | —/—/— | 126/TD/1.2 |
| Annealing | | | |
| Temp. (° C.)/Shrinking Direction/Shrinking Ratio (folds) Heat-Setting | —/—/— | —/—/— | —/—/— |
| Temperature (° C.)/Time (minute) | 127/10 | 128/10 | 126/10 |

| Properties of Multi-Layer, Microporous Membrane | | | |
|---|---|---|---|
| Average Thickness (μm) | 21.1 | 21 | 20.8 |
| Layer Thickness Ratio[5] | 0.2/0.6/0.2 | — | 0.4/0.2/0.4 |
| Air Permeability (sec/100 cm³/20 μm) | 272 | 307 | 324 |
| Porosity (%) | 38.5 | 40.2 | 36.7 |
| Pin Puncture Strength (mN/20 μm) | 4,027.8 | 4,557 | 4,351.2 |
| Tensile Rupture Strength (kPa) in MD/TD | 134,260/142,100 | 132,300/102,900 | 143,472/154,644 |
| Tensile Rupture Elongation (%) in MD/TD | 165/160 | 180/270 | 160/210 |
| Heat Shrinkage Ratio (%) in MD/TD | 4/3 | 3.7/3.6 | 4.4/3.8 |
| Meltdown Temperature (° C.) | 159 | 150 | 151 |
| Higher-Order Structure | | | |
| Average Pore Diameter (μm) in S/I[6] | 0.025/0.04 | 0.025/— | 0.025/0.05 |
| Average Pore Diameter Ratio[7] | 1.6 | — | 2 |
| Peaks (μm) in Pore Diameter Distribution[8] | 0.04/0.1/—/— | —/—/—/— | 0.04/0.1/0.7/— |
| Pore Volume Ratio[9] | 1.5 | — | 1.3 |
| Electrolytic solution Absorption Speed | 2.1 | 1 | 1.1 |
| Liquid-Retaining Ratio Under Pressure | 1 | 1 | 1 |

| | No. | | |
|---|---|---|---|
| | Com. Ex. 3 | Com. Ex. 4 | Com. Ex. 5[10] |

| First Polyethylene Resin | | | | |
|---|---|---|---|---|
| UHMWPE | Mw[1]/MWD[2]/% by mass | 2.0 × 10⁶/8/30 | —/—/— | 2.0 × 10⁶/8/30 |
| HDPE | Mw/MWD/% by mass | 3.5 × 10⁵/13.5/70 | —/—/— | 3.5 × 10⁵/13.5/70 |
| PP | Mw/% by mass | —/— | —/— | —/— |

| Second Polyethylene Resin | | | | |
|---|---|---|---|---|
| UHMWPE | Mw/MWD/% by mass | 2.0 × 10⁶/8/2 | 2.0 × 10⁶/8/2 | 2.0 × 10⁶/8/10 |
| HDPE | Mw/MWD/% by mass | 3.0 × 10⁵/8.6/98 | 3.0 × 10⁵/8.6/98 | 3.0 × 10⁵/8.6/90 |
| Mw of PE Composition | | 3.3 × 10⁵ | 3.3 × 10⁵ | 4.7 × 10⁵ |
| PP | Mw/% by mass | —/— | —/— | —/— |

| Production Conditions | | | |
|---|---|---|---|
| Concentration[3] (% by mass) Simultaneous Extrusion | 35/35 | —/35 | 35/35 |
| Layer Structure[4] | (II)/(I)/(II) | — | (I)/(I)/(I) |
| Layer Thickness Ratio[5] | 0.2/0.6/0.2 | — | 0.2/0.6/0.2 |
| Stretching of Multi-Layer, Gel-Like Sheet | | | |
| Temperature (° C.) | 117 | 118.5 | 117 |
| Magnification (MD × TD) | 5 × 5 | 5 × 5 | 5 × 5 |
| Stretching of Multi-Layer, Microporous Membrane | | | |
| Temp. (° C.)/Direction/Magnification (folds) | 127/TD/1.2 | 127/TD/1.4 | 127/TD/12 |
| Annealing | | | |
| Temp. (° C.)/Shrinking Direction/Shrinking Ratio (folds) Heat-Setting | —/—/— | —/—/— | —/—/— |
| Temperature (° C.)/Time (minute) | 127/10 | 127/10 | 127/10 |

TABLE 1-continued

Properties of Multi-Layer, Microporous Membrane

| | | | |
|---|---|---|---|
| Average Thickness (μm) | 20.5 | 19.5 | 20.2 |
| Layer Thickness Ratio[5] | 0.2/0.6/0.2 | — | 0.2/0.6/0.2 |
| Air Permeability (sec/100 cm³/20 μm) | 429 | 220 | 309 |
| Porosity (%) | 34.5 | 40 | 39.7 |
| Pin Puncture Strength (mN/20 μm) | 3,969 | 4,508 | 5,057 |
| Tensile Rupture Strength (kPa) in MD/TD | 147,980/160,720 | 116,620/155,820 | 134,260/142,100 |
| Tensile Rupture Elongation (%) in MD/TD | 150/190 | 150/115 | 160/200 |
| Heat Shrinkage Ratio (%) in MD/TD | 3.4/3.1 | 1.8/2.6 | 3.8/3.6 |
| Meltdown Temperature (° C.) | 151 | 144 | 152 |
| Higher-Order Structure | | | |
| Average Pore Diameter (μm) in S/I[6] | 0.05/— | 0.05/0.1 | 0.025/0.03 |
| Average Pore Diameter Ratio[7] | — | 2 | 1.2 |
| Peaks (μm) in Pore Diameter Distribution[8] | —/—/—/— | 0.04/0.1/0.7/1 | 0.03/—/—/— |
| Pore Volume Ratio[9] | — | 1.3 | 3.7 |
| Electrolytic solution Absorption Speed | 1.5 | 3.5 | 1.2 |
| Liquid-Retaining Ratio Under Pressure | 0.6 | 0.5 | 12 |

| | No. | |
|---|---|---|
| | Com. Ex. 6 | Com. Ex. 7 |

First Polyethylene Resin

| | | | |
|---|---|---|---|
| UHMWPE | Mw[1]/MWD[2]/% by mass | 2.0 × 10⁶/8/30 | 2.0 × 10⁶/8/30 |
| HDPE | Mw/MWD/% by mass | 3.5 × 10⁵/13.5/70 | 3.5 × 10⁵/13.5/70 |
| PP | Mw/% by mass | —/— | —/— |

Second Polyethylene Resin

| | | | |
|---|---|---|---|
| UHMWPE | Mw/MWD/% by mass | —/—/— | 2.0 × 10⁶/8/2 |
| HDPE | Mw/MWD/% by mass | 3.0 × 10⁵/8.6/95 | 3.0 × 10⁵/8.6/98 |
| Mw of PE Composition | | — | 3.3 × 10⁵ |
| PP | Mw/% by mass | 5.3 × 10⁵/5 | —/— |

Production Conditions

| | | |
|---|---|---|
| Concentration[3] (% by mass) | 35/35 | 35/35 |
| Simultaneous Extrusion | | |
| Layer Structure[4] | (I)/(II)/(I) | (I)/(II)/(I) |
| Layer Thickness Ratio[5] | 0.2/0.6/0.2 | 0.2/0.4/0.2 |
| Stretching of Multi-Layer, Gel-Like Sheet | | |
| Temperature (° C.) | 115 | 117 |
| Magnification (MD × TD) | 5 × 5 | 5 × 5 |
| Stretching of Multi-Layer, Microporous Membrane | | |
| Temp. (° C.)/Direction/Magnification (folds) | —/—/— | 131/TD/1.9 |
| Annealing | | |
| Temp. (° C.)/Shrinking Direction/Shrinking Ratio (folds) | —/—/— | —/—/— |
| Heat-Setting | | |
| Temperature (° C.)/Time (minute) | 126/10 | 131/10 |

Properties of Multi-Layer, Microporous Membrane

| | | |
|---|---|---|
| Average Thickness (μm) | 20.5 | 20.4 |
| Layer Thickness Ratio[5] | 0.2/0.6/0.2 | 0.2/0.6/0.2 |
| Air Permeability (sec/100 cm³/20 μm) | 344 | 183 |
| Porosity (%) | 35.8 | 43.9 |
| Pin Puncture Strength (mN/20 μm) | 4,822 | 5,958 |
| Tensile Rupture Strength (kPa) in MD/TD | 136,220/128,380 | 117,600/196,000 |
| Tensile Rupture Elongation (%) in MD/TD | 180/240 | 110/150 |
| Heat Shrinkage Ratio (%) in MD/TD | 4.4/4.0 | 1.8/3.7 |
| Meltdown Temperature (° C.) | 150 | 150 |
| Higher-Order Structure | | |
| Average Pore Diameter (μm) in S/I[6] | 0.025/0.04 | 0.18/0.18 |
| Average Pore Diameter Ratio[7] | 1.6 | 1.0 |
| Peaks (μm) in Pore Diameter Distribution[8] | 0.04/—/—/— | 0.18/0.1/—/— |
| Pore Volume Ratio[9] | 1.6 | — |

TABLE 1-continued

| Electrolytic solution Absorption Speed | 1.0 | 3.6 |
| Liquid-Retaining Ratio Under Pressure | 1.2 | 0.4 |

Note:
(1)Mw represents weight-average molecular weight.
(2)The molecular weight distribution represented by weight-average molecular weight/number-average molecular weight (Mw/Mn).
(3)The concentration of the first polyolefin solution and the concentration of the second polyolefin solution.
(4)The layer structure of surface layer/inner layer/surface layer, and (I) represents the first polyolefin solution, and (II) represents the second polyolefin solution.
(5)The thickness ratio of surface layer/inner layer/surface layer.
(6)S represents a surface layer, and I represents an inner layer.
(7)(Average pore diameter of second microporous layer)/(average pore diameter of first microporous layer).
(8)First to fourth peaks (μm) in the pore diameter distribution of the inner layer.
(9)The pore volume ratio in the inner layer.
(10)Although all of the three layers in Comparative Example 5 were composed of the first polyolefin, one polyolefin is listed in the column of "Second Polyolefin."

As is clear from Table 1, each three-layer, microporous polyolefin membrane of Examples 1-7 had a structure in which the second microporous layer had a larger average pore diameter than that of the first microporous layer, thereby exhibiting excellent electrolytic solution absorption and retention. They further had excellent permeability, pin puncture strength, tensile rupture strength, tensile rupture elongation, heat shrinkage resistance and meltdown properties.

The non-multi-layer, microporous membrane of Comparative Example 1 was poorer than those of Examples 1-7 in electrolytic solution absorption, because it did not have the second microporous layer having a hybrid structure. The three-layer, microporous membrane of Comparative Example 2 was poorer than those of Examples 1-7 in electrolytic solution absorption, because the total thickness of the first microporous layers was more than 60% per 100% of the total thickness of the first and second microporous layers. The three-layer, microporous membrane of Comparative Example 3 was poorer than those of Examples 1-7 in electrolytic solution absorption and retention, because it had a layer structure of second microporous layer/first microporous layer/second microporous layer. The single-layer, microporous membrane of Comparative Example 4 was poorer than those of Examples 1-7 in meltdown properties and electrolytic solution retention, because it did not have the first microporous layer in which the percentage of the ultra-high-molecular-weight polyethylene was 8% or more by mass. The three-layer, microporous membrane of Comparative Example 5 was poorer than those of Examples 1-7 in electrolytic solution absorption, because it had three first microporous layers. The three-layer, microporous membrane of Comparative Example 6 was poorer than those of Examples 1-7 in electrolytic solution absorption, because it was not re-stretched. The three-layer, microporous membrane of Comparative Example 7 was poorer than those of Examples 1-7 in electrolytic solution retention, because the stretching magnification of the microporous membrane was more than 1.8 folds.

EFFECT OF THE INVENTION

The multi-layer, microporous polyolefin membrane of the present invention has suitably well-balanced permeability, mechanical strength, meltdown properties, electrolytic solution absorption, and electrolytic solution retention. Separators formed by the multi-layer, microporous polyolefin membrane of the present invention provide batteries with excellent safety, heat resistance, storage properties and productivity.

What is claimed is:
1. A method for producing the multi-layer, microporous polyolefin membrane comprising first microporous layers constituting at least both surface layers, and at least one second microporous layer disposed between both surface layers, said first microporous layer comprising (a) a first polyethylene resin containing 8% or more by mass of ultra-high-molecular-weight polyethylene having a weight-average molecular weight of $1\times10^6$ or more, based on the total mass of the polyethylene in the first microporous layer, and (b) 25% or less by mass of polypropylene based on the total mass of the polyethylene and the polypropylene in the first microporous layer, said second microporous layer comprising a second polyethylene resin containing 7% or less by mass of said ultra-high-molecular-weight polyethylene, and having a structure in which a pore diameter distribution curve obtained by mercury intrusion porosimetry has at least two peaks, and the total thickness of said first microporous layers being 15-60% per 100% of the total thickness of said first and second microporous layers, comprising the steps of (1) preparing a first polyolefin solution comprising a first polyethylene resin containing 8% or more by mass of ultra-high-molecular-weight polyethylene having a weight-average molecular weight of $1\times10^6$ or more based on the total mass of the polyethylene in the first polyethylene resin, 25% or less by mass of polypropylene based on the total mass of the polyethylene and the polypropylene in the first polyethylene resin, and a membrane-forming solvent, and a second polyolefin solution comprising a second polyethylene resin containing 7% or less by mass of said ultra-high-molecular-weight polyethylene and a membrane-forming solvent, (2) simultaneously extruding said first and second polyolefin solutions through a die, such that said first polyolefin solution forms at least both surface layers, while said second polyolefin solution forms at least one layer between both surface layers, (3) cooling the resultant extrudate, (4) stretching the resultant multi-layer, gel-like sheet, (5) removing said membrane-forming solvent from said multi-layer, gel-like sheet, and (6) stretching the resultant multi-layer, microporous membrane to 1.1-1.8 folds in at least one direction.

2. A method for producing the multi-layer, microporous polyolefin membrane comprising first microporous layers constituting at least both surface layers, and at least one second microporous layer disposed between both surface layers, said first microporous layer comprising (a) a first polyethylene resin containing 8% or more by mass of ultra-high-molecular-weight polyethylene having a weight-average molecular weight of $1\times10^6$ or more, based on the total mass of the polyethylene in the first microporous layer, and (b) 25% or less by mass of polypropylene based on the total mass of the polyethylene and the polypropylene in the first microporous layer, said second microporous layer comprising a second polyethylene resin containing 7% or less by mass of said ultra-high-molecular-weight polyethylene, and having a structure in which a pore diameter distribution curve obtained by mercury intrusion porosimetry has at least two peaks, and the total thickness of said first microporous layers being 15-60% per 100% of the total thickness of said first and second microporous layers, comprising the steps of (1) preparing a first polyolefin solution comprising a first polyethylene resin containing 8% or more by mass of ultra-high-molecular-weight polyethylene having a weight-average molecular weight of $1\times10^6$ or more based on the total mass of the polyethylene in the first polyethylene resin, 35% or less by mass of a polypropylene based on the total mass of the polyethylene and the polypropylene in the first polyethylene resin, and a membrane-forming solvent, and a second polyolefin solution comprising a second polyethylene resin containing 7% or less by mass of said ultra-high-molecular-weight polyethylene and a membrane-forming solvent, (2) extruding said first and second polyolefin solutions through separate dies and immediately laminating them, such that said first polyolefin solution forms at least both surface layers, while said second polyolefin solution forms at least one layer between both surface layers, (3) cooling the resultant extrudate, (4) stretching the resultant multi-layer, gel-like sheet, (5) removing said membrane-forming solvent from said multi-layer, gel-like sheet, and (6) stretching the resultant multi-layer, microporous membrane to 1.1-1.8 folds in at least one direction.

3. A method for producing the multi-layer, microporous polyolefin membrane comprising first microporous layers constituting at least both surface layers, and at least one second microporous layer disposed between both surface layers, said first microporous layer comprising (a) a first polyethylene resin containing 8% or more by mass of ultra-high-molecular-weight polyethylene having a weight-average molecular weight of $1\times10^6$ or more, based on the total mass of the polyethylene in the first microporous layer, and (b) 25% or less by mass of polypropylene based on the total mass of the polyethylene and the polypropylene in the first microporous layer, said second microporous layer comprising a second polyethylene resin containing 7% or less by mass of said ultra-high-molecular-weight polyethylene, and having a structure in which a pore diameter distribution curve obtained by mercury intrusion porosimetry has at least two peaks, and the total thickness of said first microporous layers being 15-60% per 100% of the total thickness of said first and second microporous layers, comprising the steps of (1) preparing a first polyolefin solution comprising a first polyethylene resin containing 8% or more by mass of ultra-high-molecular-weight polyethylene having a weight-average molecular weight of $1\times10^6$ or more based on the total mass of the polyethylene in the first polyethylene resin, 25% or less by mass of polypropylene based on the total mass of the polyethylene and the polypropylene in the first polyethylene resin, and a membrane-forming solvent, and a second polyolefin solution comprising a second polyethylene resin containing 7% or less by mass of said ultra-high-molecular-weight polyethylene and a membrane-forming solvent, (2) extruding said first and second polyolefin solutions through separate dies, (3) cooling the resultant extrudates to form first and second gel-like sheets, (4) stretching each gel-like sheet, (5) laminating said first and second gel-like sheets, such that said first gel-like sheet forms at least both surface layers, while said second gel-like sheet forms at least one layer between both surface layers, (6) removing said membrane-forming solvent from the resultant multi-layer, gel-like sheet, and (7) stretching the resultant multi-layer, microporous membrane to 1.1-1.8 folds in at least one direction.

4. A method for producing the multi-layer, microporous polyolefin membrane comprising first microporous layers constituting at least both surface layers, and at lest one second microporous layer disposed between both surface layers, said first microporous layer comprising (a) a first polyethylene resin containing 8% or more by mass of ultra-high-molecular-weight polyethylene having a weight-average molecular weight of $1\times10^6$ or more, based on the total mass of the polyethylene in the first microporous layer, and (b) 25% or less by mass of polypropylene based on the total mass of the polyethylene and the polypropylene in the first microporous layer, said second microporous layer comprising a second polyethylene resin containing 7% or less by mass of said ultra-high-molecular-weight polyethylene, and having a structure in which a pore diameter distribution curve obtained by mercury intrusion porosimetry has at least two peaks, and the total thickness of said first microporous layers being 15-60% per 100% of the total thickness of said first and second microporous layers, comprising the steps of (1) preparing a first polyolefin solution comprising a first polyethylene resin containing 8% or more by mass of ultra-high-molecular-weight polyethylene having a weight-average molecular weight of $1\times10^6$ or more based on the total mass of the polyethylene in the first polyethylene resin, 25% or less by mass of polypropylene based on the total mass of the polyethylene and the polypropylene in the first polyethylene resin, and a membrane-forming solvent, and a second polyolefin solution comprising a second polyethylene resin containing 7% or less by mass of said ultra-high-molecular-weight polyethylene and a membrane-forming solvent, (2) extruding said first and second polyolefin solutions through separate dies, (3) cooling the resultant extrudates to form first and second gel-like sheets, (4) stretching each gel-like sheet, (5) removing said membrane-forming solvent from each stretched gel-like sheet to form first and second microporous polyolefin membranes, (6) stretching at least said second microporous polyolefin membrane to 1.1-1.8 folds in at least one direction, and (7) laminating said first and second microporous polyolefin membranes, such that said first microporous polyolefin membrane forms at least both surface layers, while said second microporous polyolefin membrane forms at least one layer between both surface layers.

* * * * *